US012808070B2

(12) United States Patent
Ho et al.

(10) Patent No.: US 12,808,070 B2
(45) Date of Patent: Nov. 24, 2026

(54) Ni2P/MoNiP2/MoP HETEROSTRUCTURE ELECTROCATALYSTS FOR EFFICIENT HYDROGEN EVOLUTION REACTION

(71) Applicant: City University of Hong Kong, Hong Kong (CN)

(72) Inventors: Chung Yin Johnny Ho, Hong Kong (CN); Xiuming Bu, Hong Kong (CN)

(73) Assignee: City University of Hong Kong, Hong Kong (CN)

( * ) Notice: Subject to any disclaimer, the term of this patent is extended or adjusted under 35 U.S.C. 154(b) by 629 days.

(21) Appl. No.: 18/449,017

(22) Filed: Aug. 14, 2023

(65) Prior Publication Data

US 2025/0059661 A1 Feb. 20, 2025

(51) Int. Cl.

| | |
|---|---|
| ***C25B 11/091*** | (2021.01) |
| ***C01B 25/08*** | (2006.01) |
| ***C25B 1/04*** | (2021.01) |
| ***C25B 11/037*** | (2021.01) |
| ***C25B 11/061*** | (2021.01) |

(52) U.S. Cl.

CPC .......... *C25B 11/091* (2021.01); *C01B 25/088* (2013.01); *C25B 1/04* (2013.01); *C25B 11/037* (2021.01); *C25B 11/061* (2021.01); *C01P 2004/16* (2013.01); *C01P 2004/64* (2013.01); *C01P 2006/40* (2013.01)

(58) Field of Classification Search

CPC ....... C25B 1/04; C25B 11/046; C25B 11/091; C25B 11/077

See application file for complete search history.

(56) References Cited

U.S. PATENT DOCUMENTS

| | | | | |
|---|---|---|---|---|
| 10,513,792 | B2 * | 12/2019 | Li | C25D 5/50 |
| 2018/0327918 | A1 * | 11/2018 | Wang | C25B 1/04 |
| 2020/0346190 | A1 * | 11/2020 | Shao | B01J 23/28 |

OTHER PUBLICATIONS

Zhao et al: "Construction of the Ni2P/MoP Heterostructure as High-Performance Cocatalyst for Visible-Light-Driven Hydrogen Production" ACS Applied Energy Materials, 2020, 3, 10910-10919. (Year: 2020).*

X. Zou et. al., Noble metal-free hydrogen evolution catalysts for water splitting, Chem. Soc. Rev., 2015, 44, 5148.

J. N. Hansen et. al., Is There Anything Better than Pt for HER?, ACS Energy Lett., 2021, 6, 1175.

S. Ye et. al., Highly stable single Pt atomic sites anchored on aniline-stacked graphene for hydrogen evolution reaction, Energy Environ. Sci., 2019, 12, 1000.

Z. Li et.al., Stable Rhodium (IV) Oxide for Alkaline Hydrogen Evolution Reaction, Adv. Mater., 2020, 32, 1908521.

M. Yang et. al., Strong electronic couple engineering of transition metal phosphides-oxides heterostructures as multifunctional electrocatalyst for hydrogen production, Appl. Catal. B Environ., 2020, 269, 118803.

(Continued)

*Primary Examiner* — Brian W Cohen

(74) *Attorney, Agent, or Firm* — S&F/WEHRW

(57) ABSTRACT

Ternary heterostructure comprising $Ni_2P$, $MoNiP_2$, and MoP, wherein the ternary heterostructure comprises crystalline regions and amorphous regions useful as an electrocatalyst for alkaline hydrogen evolution reaction; a cathode and an electrochemical cell including the same; and methods of preparation and use thereof.

20 Claims, 26 Drawing Sheets

(56) References Cited

OTHER PUBLICATIONS

X. Liu et. al. Upraising the O 2p Orbital by Integrating Ni with MoO 2 for Accelerating Hydrogen Evolution Kinetics, ACS Catal., 2019, 9, 2275-2285.
A. Muthurasu et. al., Metal-organic framework derived Co3O4MoS2 heterostructure for efficient bifunctional electrocatalysts for oxygen evolution reaction and hydrogen evolution reaction, Appl. Catal. B Environ., 2019, 248, 202-210.
M. Wang et. al., Theoretical Expectation and Experimental Implementation of in Situ Al-Doped CoS 2 Nanowires on Dealloying-Derived Nanoporous Intermetallic Substrate as an Efficient Electrocatalyst for Boosting Hydrogen Production, ACS Catal., 2019, 9, 1489-1502.
X. Bu et. al., A unique sandwich structure of a CoMnPANi2P/NiFe electrocatalyst for highly efficient overall water splitting, J. Mater. Chem. A, 2019, 7, 12325-12332.
A. Parra-Puerto et. al. Supported Transition Metal Phosphides Activity Survey for HER, ORR, OER, and Corrosion Resistance in Acid and Alkaline Electrolytes, ACS Catal., 2019, 9, 11515-11529.
H. Zhou et. al., Outstanding hydrogen evolution reaction catalyzed by porous nickel diselenide electrocatalysts, Energy Environ. Sci., 2017, 10, 1487.
X. Xu et. al., Prussian Blue Analogues Derived Penroseite (Ni,Co)Se2Nanocages Anchored on 3D Graphene Aerogel for Efficient Water Splitting, ACS Catal., 2017, 7, 6394.
Y. Chen et. al., Phase engineering of nanomaterials, Nat. Rev. Chem., 2020, 4, 243-256.
H. Li et. al., Phase Engineering of Nanomaterials for Clean Energy and Catalytic Applications, Adv. Energy Mater., 2020, 10, 2002019.
Z. W. She et. al., Combining theory and experiment in electrocatalysis Insights into materials design, Science 2017, 80. 355.
P. F. Yin et. al., Synthesis of Palladium-Based Crystalline@Amorphous Core-Shell Nanoplates for Highly Efficient Ethanol Oxidation, Adv. Mater., 2020, 32, 2000482.
J. Ge et. al., Ultrathin AmorphousCrystalline Heterophase Rh and Rh Alloy Nanosheets as Tandem Catalysts for Direct Indole Synthesis, Adv. Mater., 2021, 33, 2006711.
J. Zhao et. al., Construction of the Ni2PMOP heterostructure as a high-performance cocatalyst for visible-light-driven hydrogen production, ACS Appl. Energy Mater., 2020, 3, 10910.
P. F. Liu et. al., Ni2P(O)Fe2P(O) Interface Can Boost Oxygen Evolution Electrocatalysis, ACS Energy Lett., 2017, 2, 2257-2263.
X. Bu et. al., More than physical support: The effect of nickel foam corrosion on electrocatalytic performanance, Appl. Surf. Sci., 2021, 538, 147977.
J. Zhang et. al., Activating and Optimizing Activity of CoS2for Hydrogen Evolution Reaction through the Synergic Effect of N Dopants and S Vacancies, ACS Energy Lett., 2017, 2, 1022-1028.
X. Bu et. al., NiMo@C3N5 heterostructures with multiple electronic transmission channels for highly efficient hydrogen evolution from alkaline electrolytes, Chem. Eng. J., 2022, 438, 135379.
J. Li et. al., Ethylene-glycol ligand environment facilitates highly efficient hydrogen evolution of PtCoP through proton concentration and hydrogen spillover, Energy Environ. Sci., 2019, 12, 2298-2304.
S. Sun et. al., Impact of Surface Area in Evaluation of Catalyst Activity, Joule, 2018, 2, 1024.
Z. J. Chen et. al., Highly Dispersed Platinum on Honeycomb-like NiO@Ni Film as a Synergistic Electrocatalyst for the Hydrogen Evolution Reaction, ACS Catal., 2018, 8, 8866-8872.
K. Xu et. al., Yin-yang harmony: Metal and nonmetal dual-doping boosts electrocatalytic activity for alkaline hydrogen evolution, ACS Energy Lett., 2018, 3, 2750-2756.
S. Li et. al., Ir—O—V Catalytic Group in Ir-Doped NiV(OH)2 for Overall Water Splitting, ACS Energy Lett., 2019, 4, 1823-1829.
L. Yang et. al., Electronic Redistribution Construction and Modulation of Interface Engineering on CoP for Enhancing Overall Water Splitting, Adv. Funct. Mater., 2020, 30, 1909618.
Y. Wu et. al., Regulating the Interfacial Electronic Coupling of Fe2N via Orbital Steering for Hydrogen Evolution Catalysis, Adv. Mater., 2020, 32, 1904354.
X. Li et. al., Sequential Electrodeposition of Bifunctional Catalytically Active Structures in MoO3Ni—NiO Composite Electrocatalysts for Selective Hydrogen and Oxygen Evolution, Adv. Mater., 2020, 32, 2003414.
J. Lin et. al., Defect-Rich Heterogeneous MoS2NiS2 Nanosheets Electrocatalysts for Efficient Overall Water Splitting, Adv. Sci., 2019, 6, 1900246.
G. Yilmaz et. al., Pseudomorphic Transformation of Interpenetrated Prussian Blue Analogs into Defective Nickel Iron Selenides for Enhanced Electrochemical and Photo-Electrochemical Water Splitting, Adv. Energy Mater., 2019, 9, 1802983.
J. Li et. al., Seamless separation of OHad and Had on a Ni—O catalyst toward exceptional alkaline hydrogen evolution. Chem. A, 2022, 10, 1278.
Y. Tang et. al., Tungstate-modulated NiNi(OH)2interface for efficient hydrogen evolution reaction in neutral media, J. Mater. Chem. A, 2021, 9, 1456.
J. Huang et. al., Boosting Hydrogen Transfer during Volmer Reaction at Oxides/Metal Nanocomposites for Efficient Alkaline Hydrogen Evolution, ACS Energy Lett., 2019, 4, 3002-3010.
Z. Wang et.al., Manipulation on active electronic states of metastable phase β-NiMoO4 for large current density hydrogen evolution, Nat. Commun., 2021, 12, 5960.
K. L. Zhou et. al., Platinum single-atom catalyst coupled with transition metalmetal oxide heterostructure for accelerating alkaline hydrogen evolution reation, Nat. Commun., 2021, 12, 3783.
W. Ni et. al., An efficient nickel hydrogen oxidation catalyst for hydroxide exchange membrane fuel cells, Nat. Mater.,, 2022, 21, 804.
Z. J. Zhao et.al., Theory-guided design of catalytic materials using scaling relationships and reactivity descriptors, Nat. Rev. Mater., 2019, 4, 792-804.
Q. Wang et. al., Coordination engineering of iridium nanocluster bifunctional electrocatalyst for highly efficient and pH-universal overall water splitting, Nat. Commun., 2020, 11, 4246.
J. Li et. al., A fundamental viewpoint on the hydrogen spillover phenomenon of electrocatalytic hydrogen evolution, Nat. Commun., 2021, 12, 3502.

* cited by examiner

M

N

C

D

E

F

G

H

C

D

C

D

Table 1.

| Sample | P-O peak | P-M1 peak | P-M2 peak | P-M ratio |
|---|---|---|---|---|
| NMP-0 | 24392.75 | 776.19 | 1022.03 | 6.86% |
| NMP-5 | 18715.29 | 1668.75 | 1593.19 | 14.84% |
| NMP-10 | 18153.41 | 2433.84 | 3666.41 | 25.15% |
| NMP-20 | 12517.57 | 6831.31 | 5382.37 | 49.42% |

FIG. 10

Table 2.

| Catalyst | η (mV) | $R_s$ (Ω) | T (F $S^{n-1}$) | $R_{ct}$ (Ω) | $C_\phi$ (F) | $R_1$ (Ω) |
|---|---|---|---|---|---|---|
| NMP-10 | 20 | 5.44 | 385.6 | 11.16 | 80.3 | 11.2 |
| | 30 | 5.41 | 388.9 | 10.72 | 85.1 | 10.7 |
| | 40 | 5.38 | 391.4 | 10.38 | 89.1 | 10.4 |
| | 50 | 5.39 | 382.6 | 10.36 | 93.2 | 10.4 |
| | 60 | 5.42 | 373.9 | 10.24 | 96.8 | 10.5 |
| | 70 | 5.45 | 371.9 | 10.02 | 99.6 | 10.5 |
| | 80 | 5.43 | 357.7 | 9.31 | 103.6 | 9.3 |
| | 90 | 5.60 | 325.9 | 7.50 | 106.1 | 8.5 |
| | 100 | 5.41 | 317.5 | 6.85 | 110.0 | 8.0 |
| | 110 | 5.51 | 296.6 | 5.54 | 112.0 | 7.2 |
| | 120 | 5.51 | 278.1 | 4.06 | 113.1 | 6.4 |
| NMP-5 | 20 | 5.32 | 440.1 | 77.36 | 15.6 | 161.7 |
| | 30 | 5.42 | 463.8 | 68.04 | 21.7 | 140.3 |
| | 40 | 5.31 | 446.8 | 67.06 | 26.8 | 141.7 |
| | 50 | 5.36 | 433.3 | 66.18 | 28.8 | 143.7 |
| | 60 | 5.38 | 433.3 | 63.33 | 34.0 | 124.2 |
| | 70 | 5.40 | 422.9 | 62.59 | 35.8 | 114.6 |
| | 80 | 5.44 | 443.8 | 62.19 | 39.7 | 111.1 |
| | 90 | 5.49 | 432.1 | 62.17 | 40.9 | 105.3 |
| | 100 | 5.54 | 429.4 | 61.18 | 43.4 | 99.2 |
| | 110 | 5.52 | 424.9 | 61.35 | 43.6 | 95.6 |
| | 120 | 5.60 | 427.8 | 58.53 | 45.5 | 86.3 |
| | 130 | 5.69 | 422.1 | 56.17 | 48.4 | 83.4 |
| | 140 | 5.67 | 421.8 | 55.14 | 48.6 | 76.4 |
| | 150 | 5.72 | 410.9 | 51.23 | 51.0 | 74.9 |
| | 160 | 5.82 | 407.6 | 50.12 | 53.0 | 68.1 |

FIG. 11

| Catalyst | η (mV) | $R_s$ (Ω) | T ($F S^{n-1}$) | $R_{ct}$ (Ω) | $C_φ$ (F) | $R_f$ (Ω) |
|---|---|---|---|---|---|---|
| | 20 | 5.31 | 254.4 | 120.10 | 12.4 | 120.1 |
| | 30 | 5.34 | 250.8 | 89.37 | 16.6 | 89.4 |
| | 40 | 5.45 | 241.6 | 81.11 | 19.2 | 81.1 |
| | 50 | 5.31 | 229.8 | 76.89 | 21.1 | 76.9 |
| | 60 | 5.40 | 222.2 | 73.16 | 22.6 | 73.2 |
| | 70 | 5.39 | 211.9 | 68.85 | 24.0 | 68.9 |
| | 80 | 5.30 | 208.1 | 65.71 | 25.1 | 65.7 |
| NMP-20 | 90 | 5.41 | 206.9 | 64.04 | 25.9 | 64 |
| | 100 | 5.29 | 208.2 | 62.24 | 27.3 | 62.2 |
| | 110 | 5.32 | 207.7 | 61.70 | 28.8 | 61.7 |
| | 120 | 5.20 | 210.3 | 60.14 | 30.2 | 60.1 |
| | 130 | 5.29 | 216.7 | 58.40 | 32.5 | 58.3 |
| | 140 | 5.24 | 213.4 | 58.28 | 33.8 | 58.4 |
| | 150 | 5.31 | 214.9 | 56.01 | 35.0 | 56 |
| | 160 | 5.33 | 212.7 | 54.35 | 37.1 | 54.4 |
| | 170 | 5.37 | 211.9 | 53.25 | 39.2 | 53.3 |
| | 20 | 5.21 | 230.4 | 161.7 | 9.0 | 77.4 |
| | 30 | 5.39 | 244.8 | 144.3 | 12.3 | 68 |
| | 40 | 5.32 | 244.9 | 143.7 | 15.0 | 67.1 |
| | 50 | 5.25 | 241.6 | 133.7 | 17.1 | 66.2 |
| | 60 | 5.37 | 243.9 | 124.2 | 20.0 | 63.3 |
| | 70 | 5.41 | 234.9 | 114.6 | 21.4 | 65.3 |
| | 80 | 5.42 | 239.6 | 111.1 | 22.0 | 66.2 |
| | 90 | 5.46 | 243.0 | 105.3 | 24.1 | 62.2 |
| | 100 | 5.48 | 245.6 | 99.2 | 25.3 | 61.2 |
| NMP-0 | 110 | 5.49 | 247.2 | 95.64 | 25.8 | 61.4 |
| | 120 | 5.54 | 255.1 | 86.33 | 26.1 | 60.5 |
| | 130 | 5.54 | 257.5 | 83.39 | 26.4 | 60.7 |
| | 140 | 5.59 | 266.8 | 76.44 | 26.8 | 63.6 |
| | 150 | 5.63 | 261.9 | 74.86 | 27.1 | 56.4 |
| | 160 | 5.65 | 267.9 | 68.07 | 27.3 | 55.5 |
| | 170 | 5.64 | 267.9 | 65.14 | 27.5 | 55.6 |
| | 180 | 5.68 | 264.8 | 62.25 | 27.6 | 57.8 |
| | 190 | 5.74 | 265.6 | 59.23 | 27.9 | 52.8 |
| | 200 | 5.68 | 265.0 | 56.47 | 28.1 | 53.8 |

FIG. 11 (Continued)

Ni2P/MoNiP2/MoP HETEROSTRUCTURE ELECTROCATALYSTS FOR EFFICIENT HYDROGEN EVOLUTION REACTION

TECHNICAL FIELD

This disclosure relates to a ternary heterostructure comprising $Ni_2P$, $MoNiP_2$, and MoP useful as an electrocatalyst for alkaline hydrogen evolution reaction.

BACKGROUND

Electrochemical hydrogen evolution reaction (HER) provides one of the most attractive approaches to achieving clean and high-power density energy, drawing tremendous research interest in recent years. Until now, due to the superior catalytic performance, noble metal-based electrocatalysts have served as state-of-the-art HER catalysts; however, their scarcity and operational instability essentially limit the widespread practical application. To address these challenges, different transition metal-based oxides, sulfides, phosphides, and selenides have been developed and considered as alternative electrocatalysts for water electrolysis. One limitation is that their catalytic activity is still not sufficient, being less competitive than those of noble metal-based counterparts.

Among many latest advances, phase engineering of crystalline/amorphous heterostructure nanomaterials has revealed the effectiveness of manipulating different phase proportions in enhancing their electrochemical properties. Specifically, since HER is a two-electron transfer process involving the adsorption and desorption of hydrogen intermediate ($H_{ads}$) on the catalyst surface, the catalytic performance significantly relies on the free energy of hydrogen adsorption ($\Delta G_H$). For crystalline/amorphous heterostructure nanomaterials, the chemically inhomogeneous composition and saturation bonds on the surface may result in the $\Delta G_H$ varying over a wide range, affecting their electrochemical performance. For instance, Pd-based crystalline/amorphous heterostructure nanoplates were prepared with wet-chemical methods, where the characterization results showed their excellent ethanol oxidation reaction performance because of the coexistence of crystalline and amorphous structures, facilitating the formation of low coordination atoms and causing changes in the electronic band structure of Pd atoms. In addition, these wet-chemical methods can also be employed to construct ultrathin amorphous/crystalline Rh and bimetallic RhCu alloy nanosheets (NSs). These heterophase and alloying of Cu are beneficial for the electronic structure modulation of the active sites of Rh, thus resulting in the indole selectivity of over 99.9% with high activity. Unfortunately, the synthesis of transition metal-based crystalline/amorphous heterostructures is less explored since the redox potential of transition metal ions is significantly lower than that of noble metal ions. Although there are few studies on the phase engineering of crystalline/amorphous heterostructure nanomaterials in the literature, an in-depth study about the effect of this specific phase engineering, namely surface chemical inhomogeneity regulation, on the HER process is highly desirable but challenging.

SUMMARY

Provided herein is a facile $H_2$-assisted synthesis method to prepare crystalline/amorphous ternary $Ni_2P/MoNiP_2/MoP$ heterostructures and products and methods of use thereof. The physical characterization results show the content of $MoNiP_2$ phase and crystallinity of MoP phase can be tuned by simply controlling $H_2$ concentration. The resultant electrocatalyst exhibits a significantly superior alkaline HER performance, delivering overpotentials of 20 and 76 m V to reach current densities of 10 and 100 mA $cm^{-2}$ with a Tafel slope of 30.6 mV $dec^{-1}$, respectively. Also, the electrocatalyst displays excellent stability under a constant 100 h operation, which is higher than that of most previously reported counterparts. We experimentally demonstrated the superior performance can be attributed to the optimized hydrogen binding energy and favorable hydrogen adsorption/desorption kinetic. This work not only reveals the potential application of ternary $Ni_2P/MoNiP_2/MoP$ crystalline/amorphous heterostructure nanowires-based catalysts for larger-scale electrochemical water splitting, but also demonstrates the importance of phase engineering in the rational design and synthesis of heterostructure electrocatalysts.

In a first aspect, provided herein is a ternary heterostructure comprising $Ni_2P$, $MoNiP_2$, and MoP, wherein the ternary heterostructure comprises crystalline regions and amorphous regions.

In certain embodiments, the ternary heterostructure has a crystallinity between 30-95%.

In certain embodiments, $Ni_2P$ nanoparticles, $MoNiP_2$ nanoparticles, and MoP nanoparticles are disposed on at least one surface of the ternary heterostructure.

In certain embodiments, the ternary heterostructure comprises a plurality of nanowires.

In certain embodiments, the plurality of nanowires have an average diameter of 25-200 nm.

In certain embodiments, the ternary heterostructure has an overpotential between 20-53 mV when used as an electrocatalyst in a hydrogen evolution reaction at a current density of 10 mA $cm^{-2}$ at 25° C. in an electrolyte comprising 1M KOH.

In certain embodiments, the ternary heterostructure comprises a plurality of nanowires having an average diameter of 25-200 nm; $Ni_2P$ nanoparticles, $MoNiP_2$ nanoparticles, and MoP nanoparticles are disposed on at least one surface of each of the plurality of nanowires; and the ternary heterostructure has a crystallinity between 40-75%.

In certain embodiments, the ternary heterostructure has an overpotential between 20-53 mV when used as an electrocatalyst in a hydrogen evolution reaction at a current density of 10 mA $cm^{-2}$ at 25° C.

In certain embodiments, the ternary heterostructure has a crystallinity between 40-50%; and the ternary heterostructure has an overpotential between 20-30 mV when used as an electrocatalyst in a hydrogen evolution reaction at a current density of 10 mA $cm^{-2}$ at 25° C. in an electrolyte comprising 1M KOH.

In a second aspect, provided herein is an electrode comprising the ternary heterostructure described herein.

In a third aspect, provided herein is an electrochemical cell comprising the electrode described herein, a counter electrode, optionally a reference electrode, and an electrolyte solution comprising water and hydroxide ion.

In a fourth aspect, provided herein is a method of producing hydrogen gas, the method comprising applying an electric current between the electrode described herein and the counter electrode resulting in the electrolytic reduction of water and the formation of hydrogen gas.

In a fifth aspect, provide herein is a method of preparing the ternary heterostructure described herein, the method comprising: contacting $NiMoO_4$ with an atmosphere comprising $PH_3$, $H_2$, and optionally an inert gas thereby forming the ternary heterostructure.

In certain embodiments, the step of contacting $NiMoO_4$ with the atmosphere comprising $PH_3$, $H_2$, and optionally the inert gas is conducted at a temperature between 400-700° C.

In certain embodiments, the method further comprises the step of heating $NaH_2PO_2$ thereby generating $PH_3$.

In certain embodiments, the $NaH_2PO_2$ is heated at a temperature between 400-700° C.

In certain embodiments, the $NiMoO_4$ is supported on a nickel foam substrate.

In certain embodiments, the is $NiMoO_4$ is contacted with the $H_2$ at a concentration of 2.5-10% v/v in the inert gas.

In certain embodiments, the ternary heterostructure has a crystallinity between 40-50%.

In certain embodiments, the method comprises: contacting $NiMoO_4$ an atmosphere comprising $PH_3$, $H_2$, and argon gas at a temperature of 450-550° C., wherein the $NiMoO_4$ is supported on a nickel foam substrate; the $NiMoO_4$ is contacted with the $H_2$ at a concentration of 2.5-5% v/v in argon gas thereby forming the ternary heterostructure, wherein the ternary heterostructure comprises a plurality of nanowires having an average diameter of 25-100 nm, wherein $Ni_2P$ nanoparticles, $MoNiP_2$ nanoparticles, and MoP nanoparticles disposed on at least one surface of each of the plurality of nanowires, wherein the ternary heterostructure has a crystallinity between 40-50%.

BRIEF DESCRIPTION OF THE DRAWINGS

The above and other objects and features of the present disclosure will become apparent from the following description of the disclosure, when taken in conjunction with the accompanying drawings.

FIG. 10. Depicts Table 1 showing the peak intensity collected in the P 2*p* XPS spectrum with XPS PEAK software.

FIG. 11. Depicts Table 2 showing the fitted parameters of the EIS data of NMP-0, NMP-5, NMP-10 and NMP-20, respectively.

DETAILED DESCRIPTION

Throughout the present disclosure, unless the context requires otherwise, the word "comprise" or variations such as "comprises" or "comprising", will be understood to imply the inclusion of a stated integer or group of integers but not the exclusion of any other integer or group of integers. It is also noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the present invention.

Furthermore, throughout the present disclosure and claims, unless the context requires otherwise, the word "include" or variations such as "includes" or "including", will be understood to imply the inclusion of a stated integer or group of integers, but not the exclusion of any other integer or group of integers.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10%, ±7%, ±5%, ±3%, ±1%, or ±0% variation from the nominal value unless otherwise indicated or inferred.

Provided herein is a ternary heterostructure comprising $Ni_2P$, $MoNiP_2$, and MoP, wherein the ternary heterostructure comprises crystalline regions and amorphous regions. In certain embodiments, the ternary heterostructure is disposed on a nickel foam substrate.

The surface of the ternary heterostructure may have a predominately crystalline structure. In certain embodiments, the crystalline regions of the ternary heterostructure may account for 30-95%, 35-95%, 40-95%, 45-95%, 50-95%, 55-95%, 60-95%, 60-90%, 60-85%, 60-80%, 65-80%, 70-80%, 70-75%, 70-95%, or 74.26-96.34% by surface area of the ternary heterostructure. In certain embodiments, the ternary heterostructure has a crystallinity of about 74.26% by surface area of the ternary heterostructure.

Figure 2:
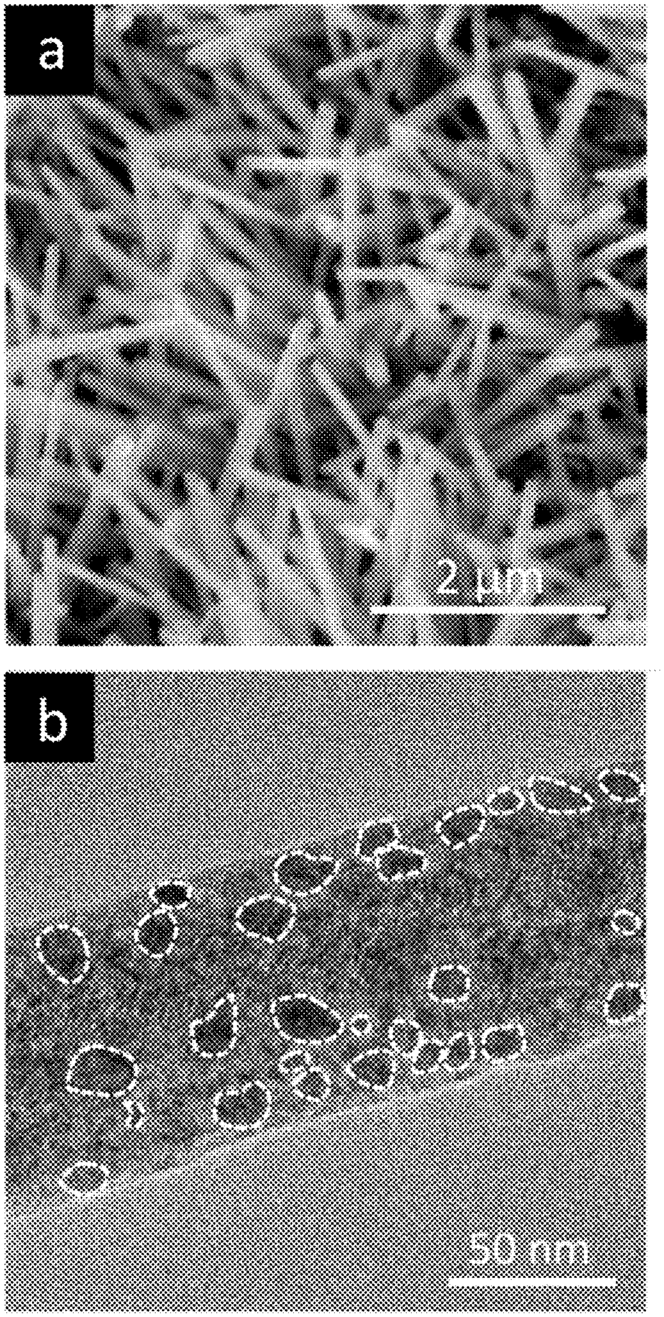
FIG. 2. Structure evolution process. (a) SEM image, (b) TEM image, (c) HRTEM image and corresponding (d) SAED image of the NMP-0 sample; (e) SEM image, (f) TEM image, (g) HRTEM image and corresponding (h) SAED image of the NMP-5 sample; (i) SEM image, (j) TEM image, (k) HRTEM image and corresponding (I) SAED image of the NMP-20 sample; (m) Summarized area ratio of the crystalline regions; (n) XRD patterns of the prepared four samples.
Figure 2:
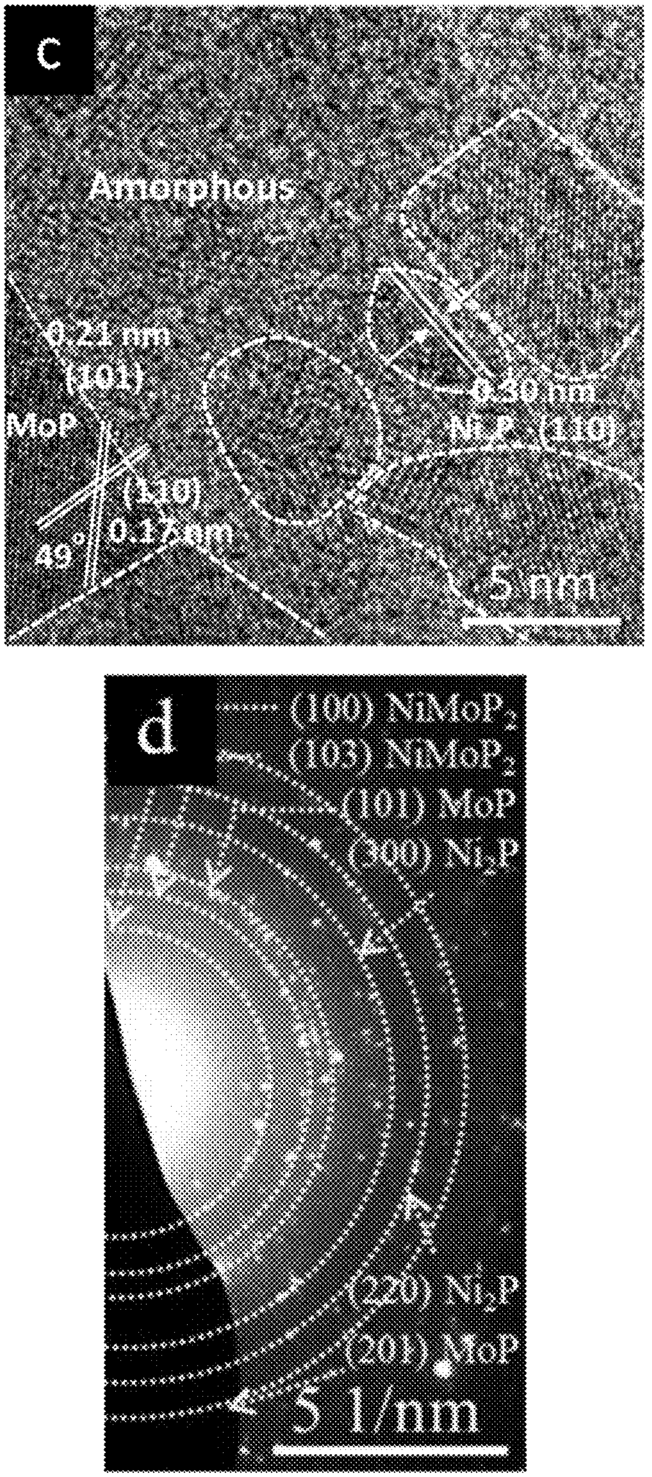
Figure 2:
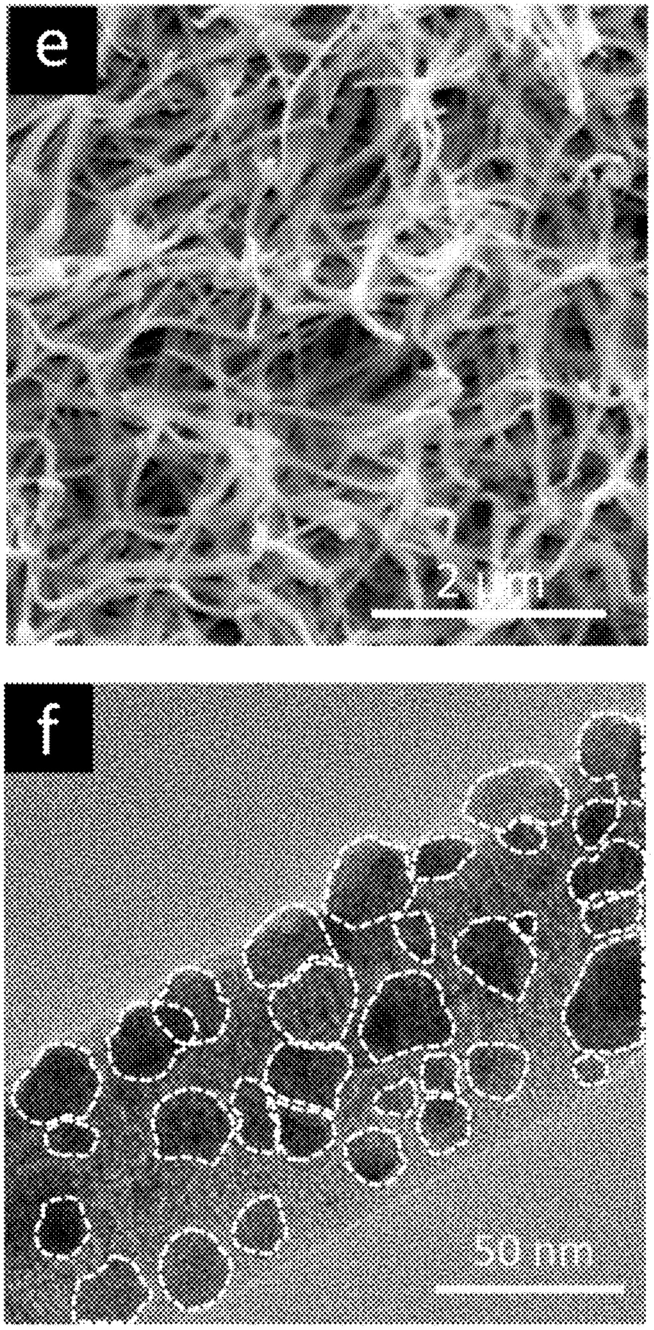
Figure 2:
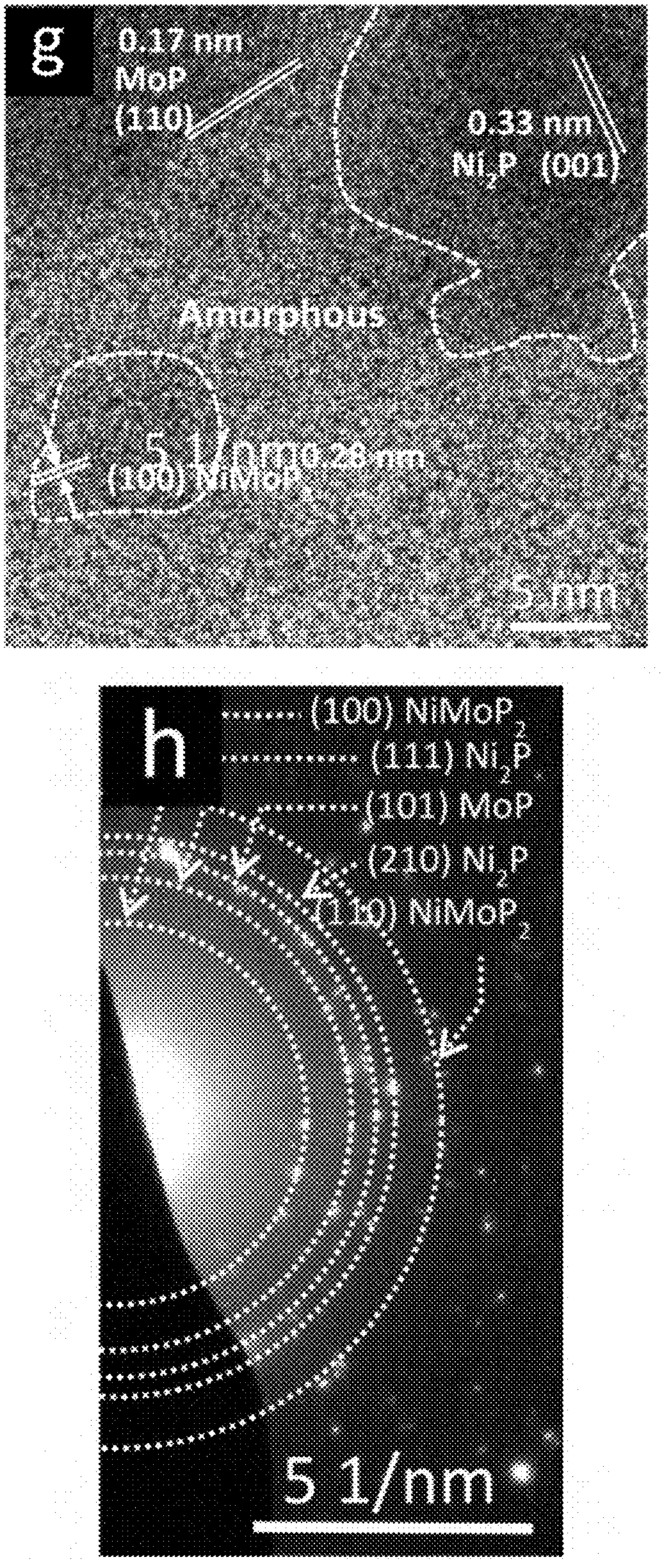
Figure 2:
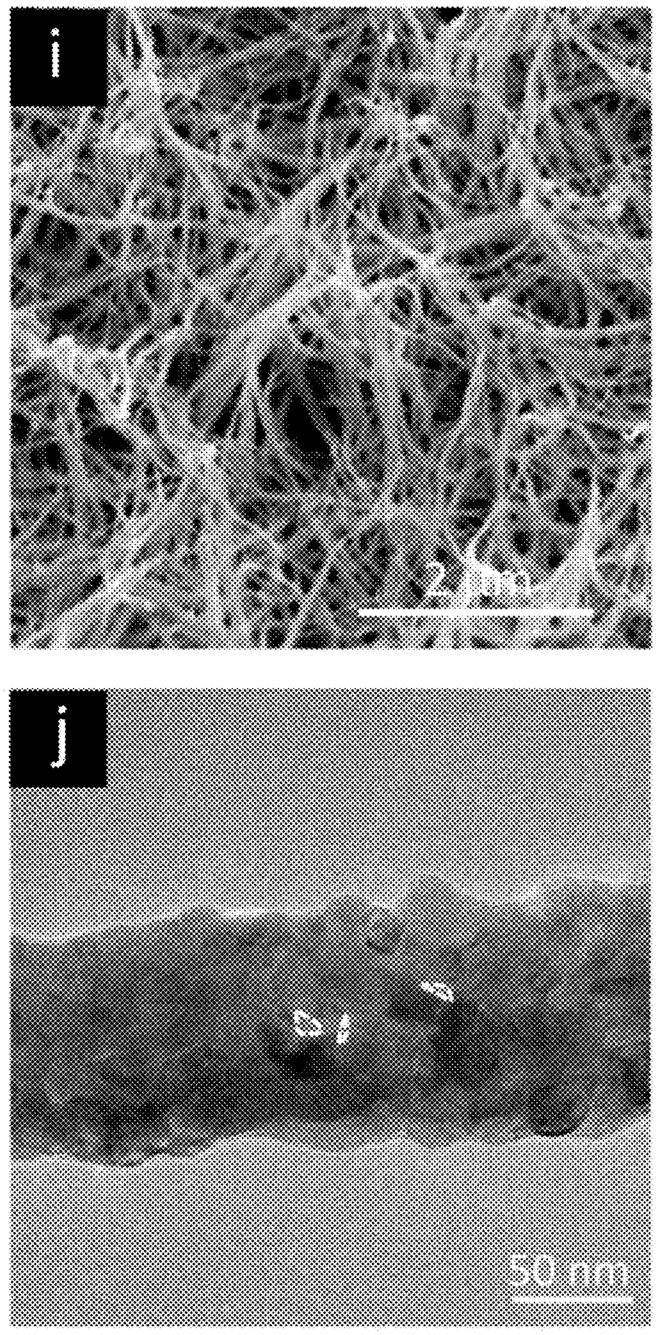
Figure 2:
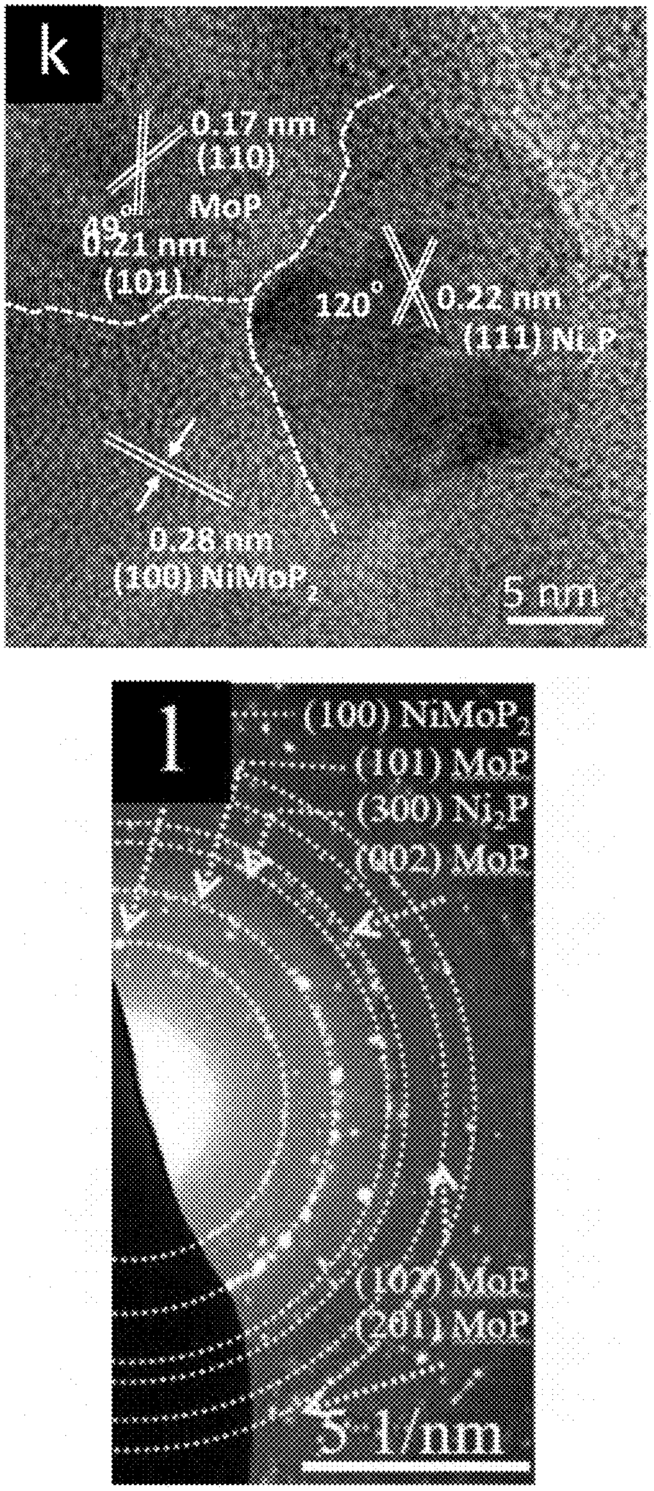
Figure 2:
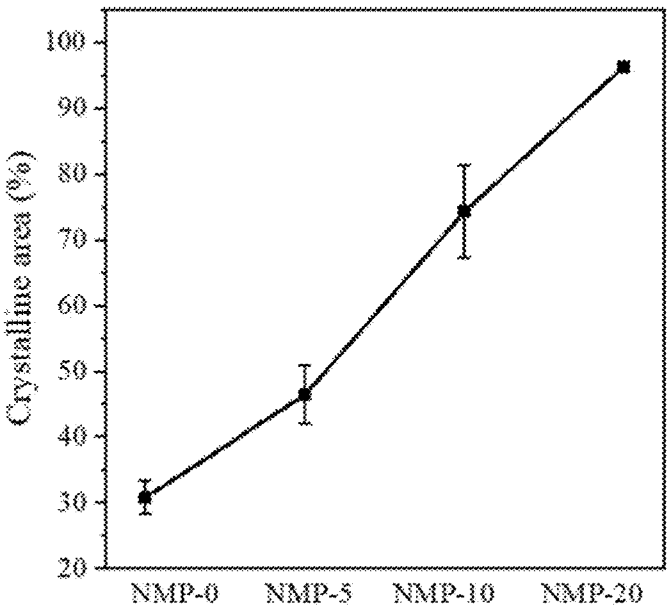
Figure 2:
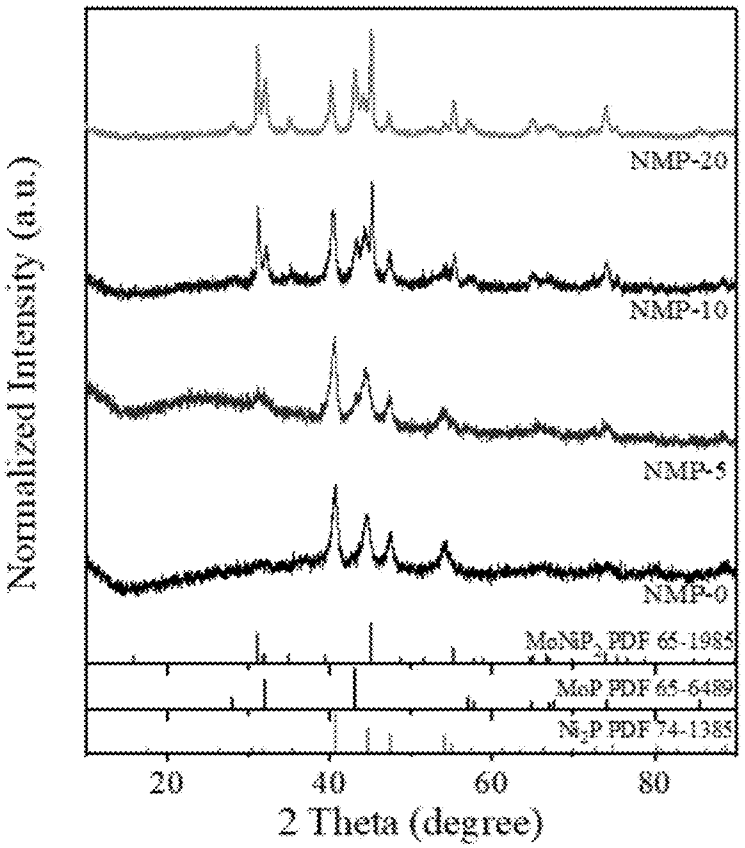

$Ni_2P$ nanoparticles, $MoNiP_2$ nanoparticles, and MoP nanoparticles can be disposed on at least one surface of the ternary heterostructure. In certain embodiments, the $MoNiP_2$ nanoparticles, and MoP nanoparticles have an average lateral size of between 2-40 nm, 10-40 nm, 20-40 nm, or 20-30 nm. In certain embodiments, the $MoNiP_2$ nanoparticles, and MoP nanoparticles have an average lateral size of about 26 nm As illustrated in FIG. 2, the ternary heterostructure can comprise a plurality of nanowires. The average diameter of the plurality of nanowires generally depends on the reaction conditions used for preparing the ternary heterostructure and can range from 25-200 nm, 25-175 nm, 25-150 nm, 25-125 nm, 25-100 nm, 25-75 nm, 25-50 nm, 50-100 nm, 50-200 nm, 75-200 nm, 100-200 nm, 100-150 nm, 125-200 nm, 150-200 nm, 175-200 nm, 50-175 nm, 75-150 nm, or 100-125 nm. In certain embodiments, the average diameter of the plurality of nanowires is about 50 nm, about 100 nm, or about 150 nm.

The ternary heterostructure can be prepared by a method comprising: contacting $NiMoO_4$ with an atmosphere comprising $PH_3$, $H_2$, and optionally an inert gas thereby forming the ternary heterostructure. In certain embodiments, the $NiMoO_4$ is disposed on a nickel foam substrate.

The atmosphere comprising $PH_3$, $H_2$, and optionally an inert gas can be reacted with the $NiMoO_4$ at 400° C. or greater. In certain embodiments, the atmosphere comprising $PH_3$, $H_2$, and optionally an inert gas is reacted with the $NiMoO_4$ at 400-1,000° C., 400-900° C., 400-800° C., 400-700° C., 400-600° C., 450-600° C., 450-550° C., or 475-525° C. In certain embodiments, the atmosphere comprising $PH_3$, $H_2$, and optionally an inert gas is reacted with the $NiMoO_4$ at about 500° C.

The $PH_3$ used in the methods described herein is available commercially or can be prepared using any method known in the art. In certain embodiments, the $PH_3$ is prepared in situ by thermal decomposition of $NaH_2PO_2$ or a hydrate thereof (e.g., $NaH_2PO_2$:$H_2O$) in the presence of the $NiMoO_4$. In certain embodiments, $NaH_2PO_2$ or a hydrate thereof is heated at a temperature of 400° C. or greater. In certain embodiments, the $NaH_2PO_2$ or a hydrate thereof is heated at a temperature of 400-1,000° C., 400-900° C., 400-800° C., 400-700° C., 400-600° C., 450-600° C., 450-550° C., or 475-525° C. In certain embodiments, the $NaH_2PO_2$ or a hydrate thereof is heated at a temperature of about 400° C. The temperature of the reaction can be ramped at a rate of 1-10° C./min, 1-9° C./min, 1-8° C./min, 1-7° C./min, 1-6° C./min, 1-5° C./min, 1-4° C./min, 1-3° C./min, or 2-3° C./min.

The inert gas can be helium, nitrogen, argon, neon, and mixtures thereof. In certain embodiments, the inert gas is argon.

In embodiments in which an inert gas is present, the atmosphere can comprise $H_2$ at a concentration of 2-20% v/v, 2-19% v/v, 2-18% v/v, 2-17% v/v, 2-16% v/v, 2-15% v/v, 2-14% v/v, 2-13% v/v, 2-12% v/v, 2-11% v/v, 2-10% v/v, 3-10% v/v, 4-10% v/v, 5-10% v/v, 6-10% v/v, 7-10% v/v, 8-10% v/v, 9-10% v/v, 5-15% v/v, 6-14% v/v, 7-13% v/v, 8-12% v/v, or 9-11% v/v in the inert gas. In certain embodiments, the atmosphere comprises $H_2$ at a concentration of about 10% v/v in the inert gas.

Then, the samples were treated at 500° C. for 2 h with a heating rate for 2.5° C./min under Ar/$H_2$ atmosphere, and the flow rate was adjusted to 200/0, 195/5, 190/10, and 180/20 sccm, The atmosphere comprising $H_2$ and optionally an inert gas can be brought into contact with the $NaH_2PO_2$ at a rate of 10-300 sccm, 50-300 sccm, 100-300 sccm, 150-300 sccm, 150-250 sccm, or 175-225 sccm. In certain embodiments, the atmosphere comprising $H_2$ and optionally an inert gas can be brought into contact with the $NaH_2PO_2$ at a rate of about 200 sccm.

The is $NiMoO_4$ can be contacted with the $H_2$ at a rate of 1-50, 1-45, 1-40, 1-35, 1-30, 1-25, 1-20, 5-20, 5-15, 6-14, 7-13, 8-12, or 9-11 standard cubic centimeters per minute (sccm). In certain embodiments, the $NiMoO_4$ is contacted with $H_2$ and the inert gas at rate of The atmosphere comprising $H_2$ and the inert gas can be brought into contact with the $NaH_2PO_2$ at a rate of 200 sccm with a concentration of $H_2$ of 2.5-10% v/v, 2.5-7.5% v/v, 2.5-5% v/v, or 5-10% v/v.

The present disclosure also provides an electrode comprising the ternary heterostructure described herein.

Also provided is an electrochemical cell comprising two or more electrodes, wherein the two or more electrodes can comprise an electrode comprising the ternary heterostructure described herein, a counter electrode (or counter/reference electrode), optionally a reference electrode (e.g., in a three-electrode system) and an electrolyte solution comprising hydroxide ion between and in contact with the electrode, the counter electrode, and optionally the reference electrode.

A counter electrode refers to an electrode paired with the working electrode, through which passes a current equal in magnitude and opposite in sign to the current passing through the working electrode. The counter electrode can include counter electrodes which also function as reference electrodes (i.e., a counter/reference electrode). Any suitable counter electrode known in the art can be used in connection with the methods described herein. For example, the counter electrode can comprise carbon (e.g., highly oriented pyrolytic graphite), a metal (e.g., platinum), an alloy (e.g., stainless steel), glassy carbon, a conductive polymer, or the like.

The reference electrode can be selected from a standard hydrogen electrode, calomel electrode, copper-copper (II) sulfate electrode, silver chloride electrode, palladium-hydrogen electrode, mercury-mercurous sulfate electrode, and the like.

The electrolyte solution can comprise hydroxide derived from a hydroxide source selected from the group consisting of LiOH, NaOH, KOH, CsOH, $Mg(OH)_2$, $Ca(OH)_2$, $Sr(OH)_2$, and a mixture thereof.

The concentration of hydroxide ion in the electrolyte solution can range from 0.1-10 M, 0.1-9 M, 0.1-8 M, 0.1-7 M, 0.1-6 M, 0.1-5 M, 0.1-4 M, 0.1-3 M, 0.1-2 M, 0.5-1.5 M, or 0.75-1.25 M. In certain embodiments, the concentration of hydroxide ion in the electrolyte solution is about 1 M.

The present disclosure also provides a method of producing hydrogen gas, the method comprising applying an electric current between the electrode comprising the comprising the ternary heterostructure described herein and the counter electrode resulting in the electrolytic reduction of water and the formation of hydrogen gas.

The ternary heterostructure can have an overpotential between 20-85 mV, 20-67 mV. 20-53 mV, 20-50 mV. 20-45 mV, 20-40 mV, 20-35 mV, 20-30 mV, or 20-25 mV, when used as an electrocatalyst in a hydrogen evolution reaction at a current density of 10 mA $cm^{-2}$ at 25° C. in an electrolyte comprising 1 M KOH. In certain embodiments, the ternary heterostructure has an overpotential of about 20 mV when used as an electrocatalyst in a hydrogen evolution reaction at a current density of 10 mA $cm^{-2}$ at 25° C. in an electrolyte comprising 1 M KOH.

Figure 1:
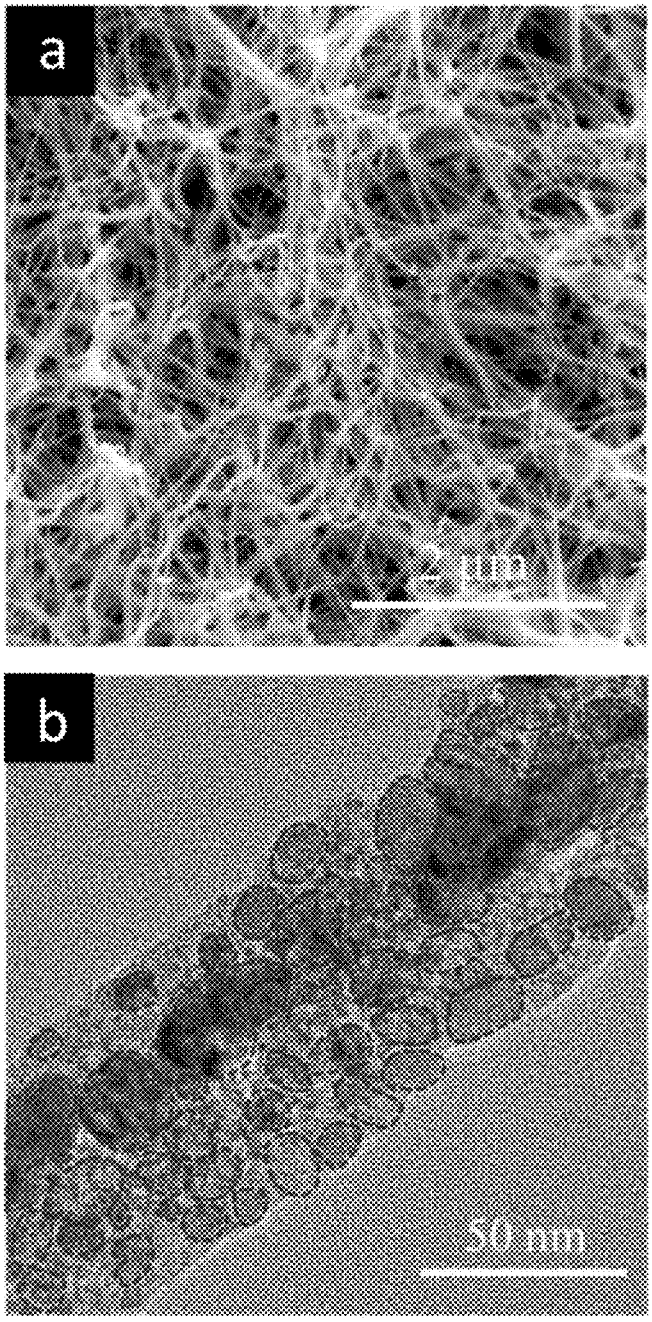
FIG. 1. Physical characterization. (a) SEM image, (b) TEM image, (c) HRTEM image and corresponding (d) SAED image of the NMP-10 sample; (e-h) high-angle annular dark field (HAADF) STEM image and corresponding elemental mapping of Ni, Mo, and P of the NMP-10 catalyst, respectively. The scale bar in the (e) is 200 nm.
Figure 1:
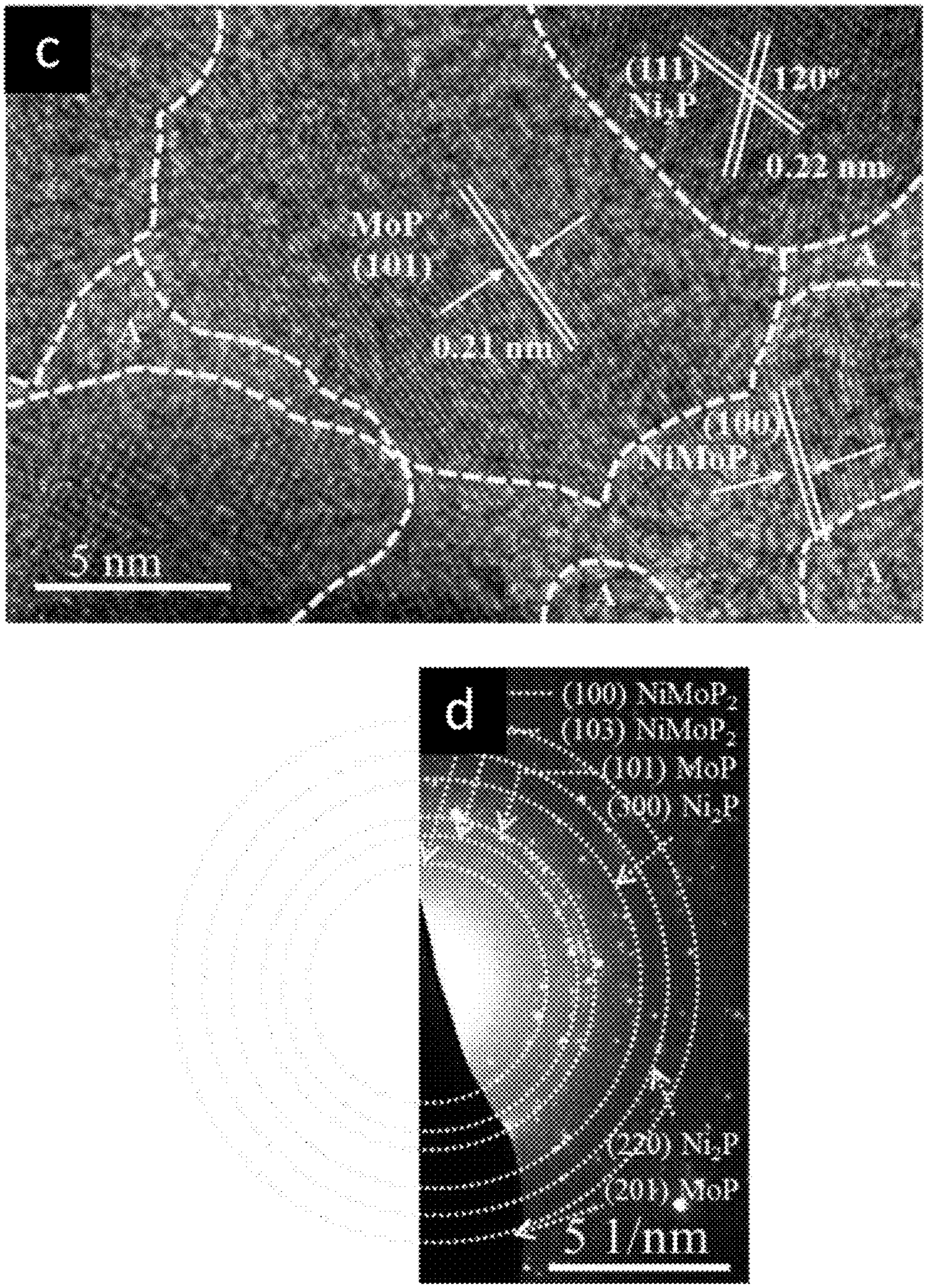
Figure 1:
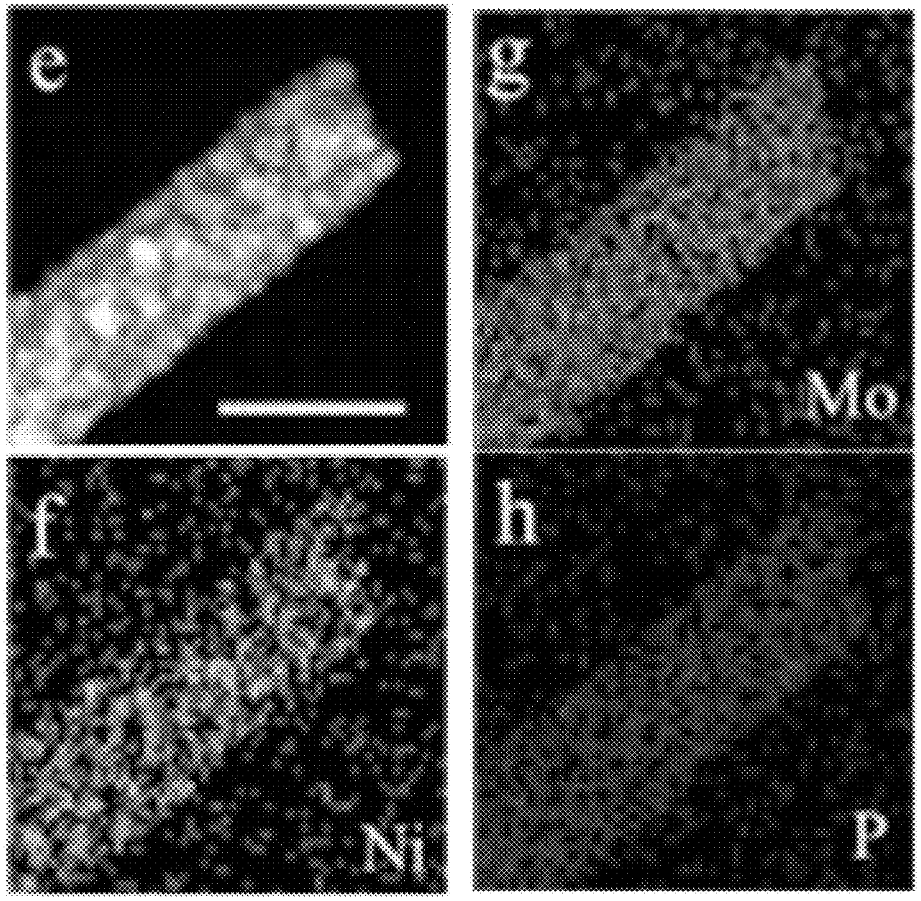

The $Ni_2P/MoNiP_2/MoP$ ternary heterostructure was prepared by phosphorylating $NiMoO_4$ nanowires via $NaH_2PO_2$ at 500° C. in a mixed atmosphere of $Ar/H_2$ (190:10, v/v, denoted with NMP-10). The morphology of NMP-10 was first observed by scanning electron microscopy (SEM). It is found that the nickel foam substrate is completely covered with twisted nanowires with a diameter of about 50 nm (FIG. 1*a*). The transmission electron microscopy (TEM) image shows numerous protuberant crystalline nanoparticles (marked with dotted circles) attached to the nanowire backbone (FIG. 1*b*). This observation indicates that the phosphorization process may trigger the segregation of Ni and Mo elements from the bimetallic oxide precursor, being consistent with the previous reports. In addition, according to the high-resolution TEM (HRTEM) image as presented in FIG. 1*c*, the lattice spacing of 0.22, 0.21, and 0.28 nm are ascribed to the (111) plane of $Ni_2P$ (JCPDS NO. 74-1385), (101) plane of MoP (JCPDS NO. 65-6489) and (100) plane of $MoNiP_2$ (JCPDS NO. 65-1985), respectively. At the same time, abundant crystalline/amorphous interfaces are observed on the surface of catalysts (amorphous area marked with A). The polycrystalline rings displayed in the selected area electron diffraction (SEAD) can be indexed to the (220) and (300) planes of $Ni_2P$. (100) and (103) planes of $MoNiP_2$, and (101) and (201) planes of MoP, accordingly (FIG. 1*d*), further supporting the successful preparation of $Ni_2P/MoNiP_2/MoP$ ternary heterostructures. The elemental mapping reveals that within the NMP-10 nanowire, P and Mo elements are uniformly distributed while the Ni element is enriched in certain regions (FIG. 1*e-h*), designating the obvious phase separation that occurred during the preparation process.

Figure 6:
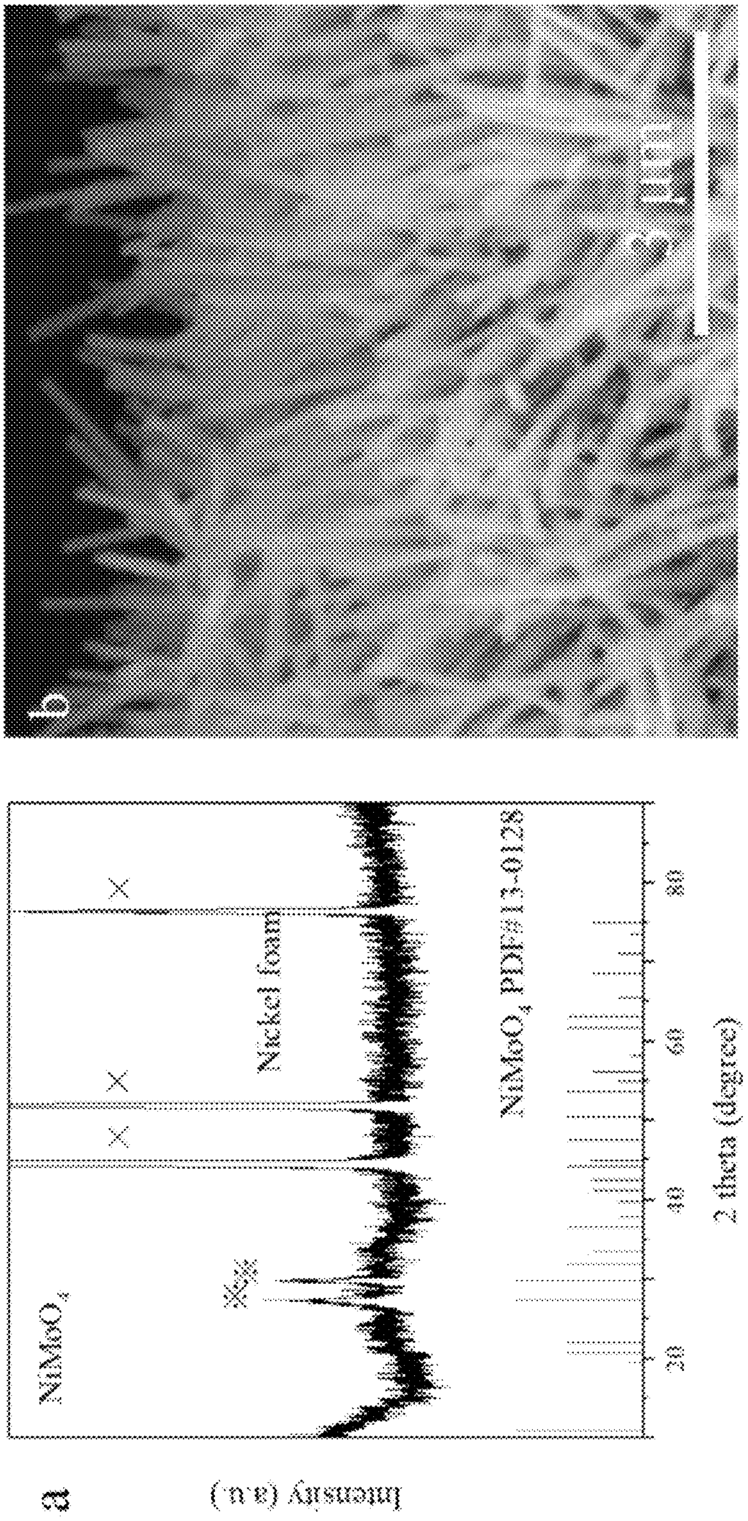
FIG. 6. Depicts (a) XRD pattern and (b) SEM image of the $NiMoO_4$.
Figure 7:
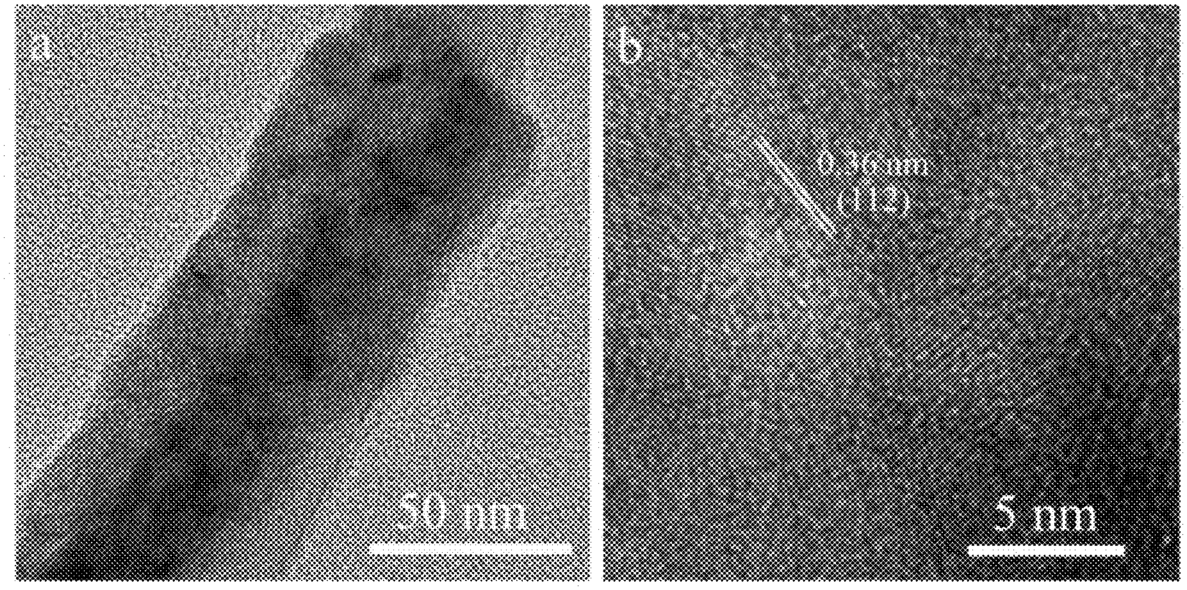
FIG. 7. Depicts (a) TEM image and (b) HRTEM image of $NiMoO_4$.

To further confirm the precise control of the crystalline/amorphous phase engineering, a series of samples were carefully fabricated by optimizing the $H_2$ concentration. $Ni_2P/MoP$ was also prepared without introducing $H_2$ (denoted with NMP-0) for comparison. The morphology of NMP-0 was first observed by SEM (FIG. 2*a*). In contrast to the SEM image taken for the original $NiMoO_4$ nanowires (FIG. 6), almost no morphological changes were observed after phosphorylation. Also, nanowires, with a typical diameter of ~150 nm, were aligned vertically and covered totally on the surface of the nickel foam substrate. As shown in the TEM image (FIG. 2*b*), there are some crystalline nanoparticles (marked with dotted circles) attached to the nanowire backbone, which is different from the smooth surface of $NiMoO_4$ (FIG. 7). The observed apparent phase separation phenomenon on the NMP-0 surface is due to the transformation of $NiMoO_4$ into the Ni—$MoO_2$ heterostructure (Ni nanoparticles anchored on the $MoO_2$ backbone) under high temperatures. At the same time, phosphorylation into $Ni_2P/MoP$ occurs due to reaction with $PH_3$. The HRTEM image displays the intimate contact between $Ni_2P$ and MoP. The lattice fringes of 0.30, 0.17, and 0.21 nm are well indexed to the (110) plane of $Ni_2P$, (110) and (101) planes of MoP, respectively (FIG. 2*c*). In addition, SEAD can be indexed to the (111), (210), and (300) planes of $Ni_2P$ and the (101) plane of MoP (FIG. 2*d*). After introducing $H_2$ ($Ar:H_{2=195:5}$, v/v, denoted NMP-5), the nanowires became curved and decreased in diameter (~87 nm, FIG. 2*e*). Meanwhile, TEM images showed a significant increase in the density of giant highly crystalline nanoparticles on the amorphous backbone (FIG. 2*f*). Surprisingly, a new phase of $NiMoP_2$ was observed in the HRTEM and SEAD results, where the lattice fringe space of 0.28 nm is assigned to the (100) plane of $NiMoP_2$ (FIGS. 2*g* and 2*h*). However, when the hydrogen flow rate increases to 20 SCCM (denoted NMP-20), the nanowires aggregated, and the diameter slightly increased based on the statistics result (~68 nm, FIG. 2*i*). The TEM image shows that the nanowire backbone is almost entirely covered by a highly crystalline surface, with only small areas exhibiting amorphous features (FIG. 2*j*, marked with dotted circles). The HRTEM image and SEAD result show that all $Ni_2P$, $MoNiP_2$, and MoP have high crystalline characteristics, and clear grain boundaries are observed (FIGS. 2*k* and 2*l*). The mass content of NMP-20, NMP-10, NMP-5, and NMP-0 was determined to be: $MoNiP_2$, MoP and $Ni_2P$ is 49.1:29.1:21.8 for NMP-20, 17.7:13.8:68.5 for NMP-10, 1.4:2.6:96 for NMP-5. MoP:$Ni_2P$=2.4:97.6 for NMP-0. Crystalline surface area for NMP-0, 5, 10 and 20 is 30.62%, 46.38%, 74.26% and 96.34%, respectively. Then a rough area ratio of the crystalline region was summarized in FIG. 2*m*. It is clear that the crystalline/amorphous area ratio increases with the increase of hydrogen concentration in the gas mixture, which can be attributed to the fact that the introduced hydrogen reduces the reaction barrier between MoP and $Ni_2P$ in the $PH_3$ atmosphere to produce $NiMoP_2$, the content of which is hydrogen concentration dependent. Moreover, this hydrogen concentration-dependent plays a decisive role in the crystallization/amorphous ratio. The above characterization results demonstrate that the $H_2/PH_3$ mixture significantly affects the surface chemical inhomogeneity. More phase and crystal structure information can be obtained in the X-ray diffraction (XRD) plots (FIG. 2*n*). In the NMP-O sample, compared with the crystalline peak of $Ni_2P$, the peak of MoP is weak, indicating that MoP is mainly present in the form of an amorphous phase, being consistent with the TEM result. After introducing hydrogen, a new phase of $MoNiP_2$ appeared in the sample, and the crystallinity of MoP gets significantly increased, further indicating the successful phase engineering in the $Ni_2P/MoNiP_2/MoP$ ternary heterostructure.

Figure 3:
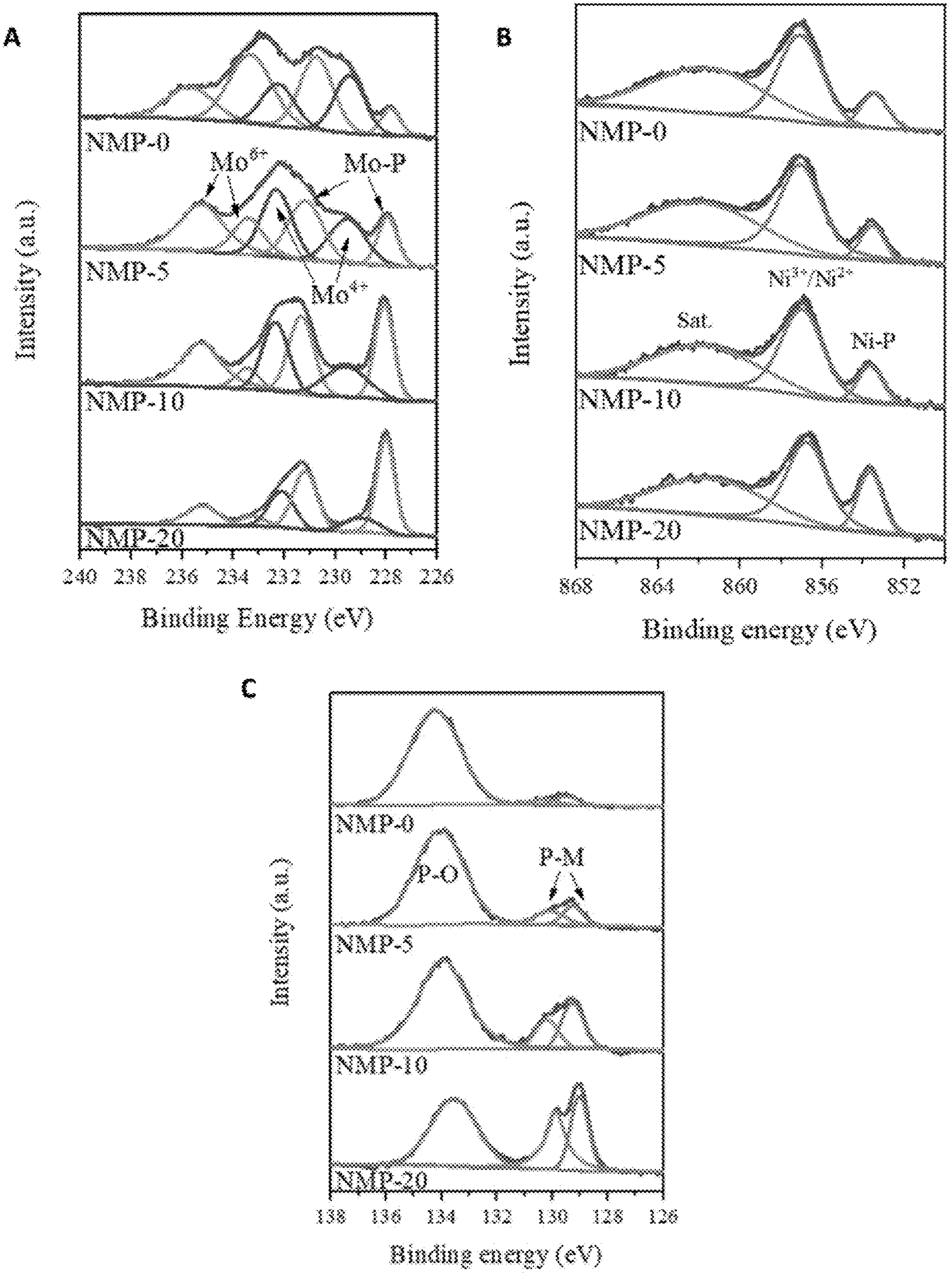
FIG. 3. Surface electronic structure analysis. XPS spectra for (a) Ni 2*p*, (b) Mo 3*d*, (c) P 2*p* for these four samples, respectively. (d) Calculated P-M bonding ratio, (e) Ni/Mo ratio obtained from the XPS and ICP results. (f) Schematic of the structure evolution diagram of the prepared electrocatalysts.
Figure 3:
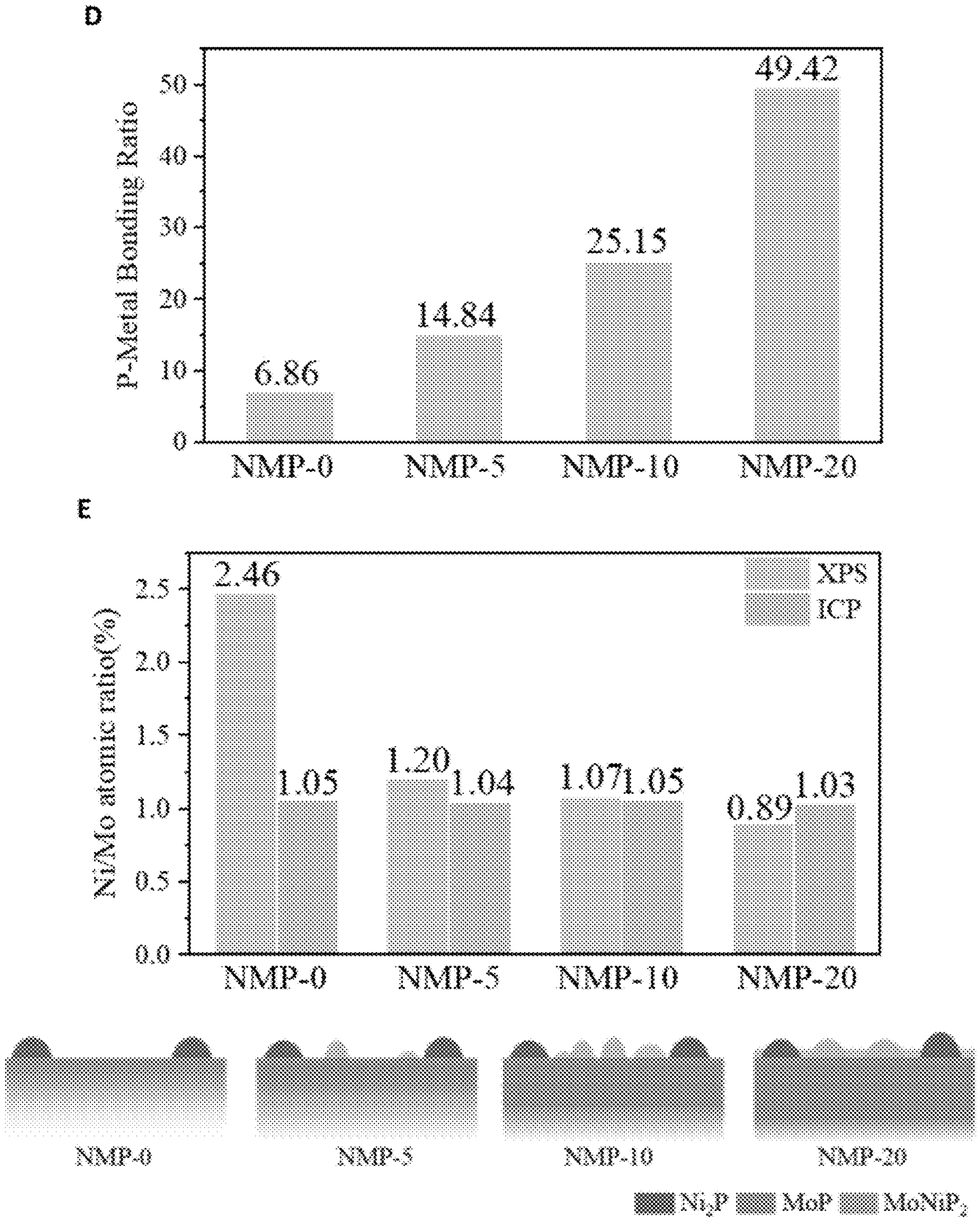

Since phase engineering significantly affects the surface electronic structure of materials, X-ray photoelectron spectroscopy (XPS) is then employed to investigate surface chemical states and chemical compositions of obtained electrocatalysts. For Ni 2*p* spectra, the main peak located at 853.4, 857.0, and 861.8 eV can be ascribed to the Ni—P bonding peak, oxidized $Ni^{2+}/Ni^{3+}$ peak, and satellite peak, respectively (FIG. 3*a*). With the increasing hydrogen flow rate, the apparent blue shift and increased Ni—P peak intensity are observed in the spectrum, indicating the electron transfer into the Ni atom in the coordination environment. In the Mo 3*d* spectrum, the peak located at 235.7 eV as well as 233.4 eV are assigned to $Mo^{6+}$, the peaks at 232.3 eV and 229.5 eV are ascribed to $Mo^{4+}$, while the Mo—P peaks are centered at 230.8 eV and 227.8 eV, respectively (FIG. 3*b*). Meanwhile, with the increasing hydrogen concentration, the red shift phenomenon and increased Mo—P peak in the Mo 3*d* spectrum were observed, indicating the electron loss of Mo atoms. Regarding the P 2*p* spectra of the catalysts, the increase of the P-M peaks located at 129.3 and 130.3 eV indicates the controllable P-M bonding ratio in the electrocatalyst, posing a strong effect on the surface electronic structure (FIG. 3*c*). Particularly, for the NMP-20 catalyst, the surface P-M bond ratio can reach 49.42% (FIG. 3*d*, FIG. 10). In addition, since the detection depth of the XPS technique is 3-10 nm, while the emission spectroscopy results of inductively coupled plasma (ICP) can give an overall composition analysis, combining these two characterization techniques can give more detailed information on the composition of the surface and the interior regions. As shown in FIG. 3*e*, the ICP results show that these catalysts' Ni/Mo ratio values remain almost constant. In contrast, the XPS results reveal that this value decreases continuously with the increasing hydrogen ratio, indicating the outward migration of Mo atoms due to the reaction between MoP and $Ni_2P$. Combined with the previous analysis, the surface structure and composition evolution of the electrocatalyst is proposed, as shown in FIG. 3*f*. When only $PH_3$ is introduced, the outward migration and phosphorylation of Ni atoms occur simultaneously, and highly crystalline $Ni_2P$ nanoparticles are formed on the surface. While for the Mo atoms, only a small fraction of Mo atoms precipitate from the backbone to form the crystalline MoP phase (XRD result for NMP), and most of the Mo atoms react with $PH_3$ to form an amorphous MoP nanowire backbone. Once hydrogen is introduced into the system, the Mo atoms become active, resulting in the crystalline improvement of MoP. More importantly, the reaction barrier between MoP and $Ni_2P$ is decreased, and a new phase $MoNiP_2$ is formed on the interface of the MoP/$Ni_2P$ heterostructure. With the increasing hydrogen concentration, the increased crystallinity of all phases and enhanced relative $MoNiP_2$ content are confirmed until the surface of the catalyst is completely covered with the highly crystalline phase.

Figure 4:
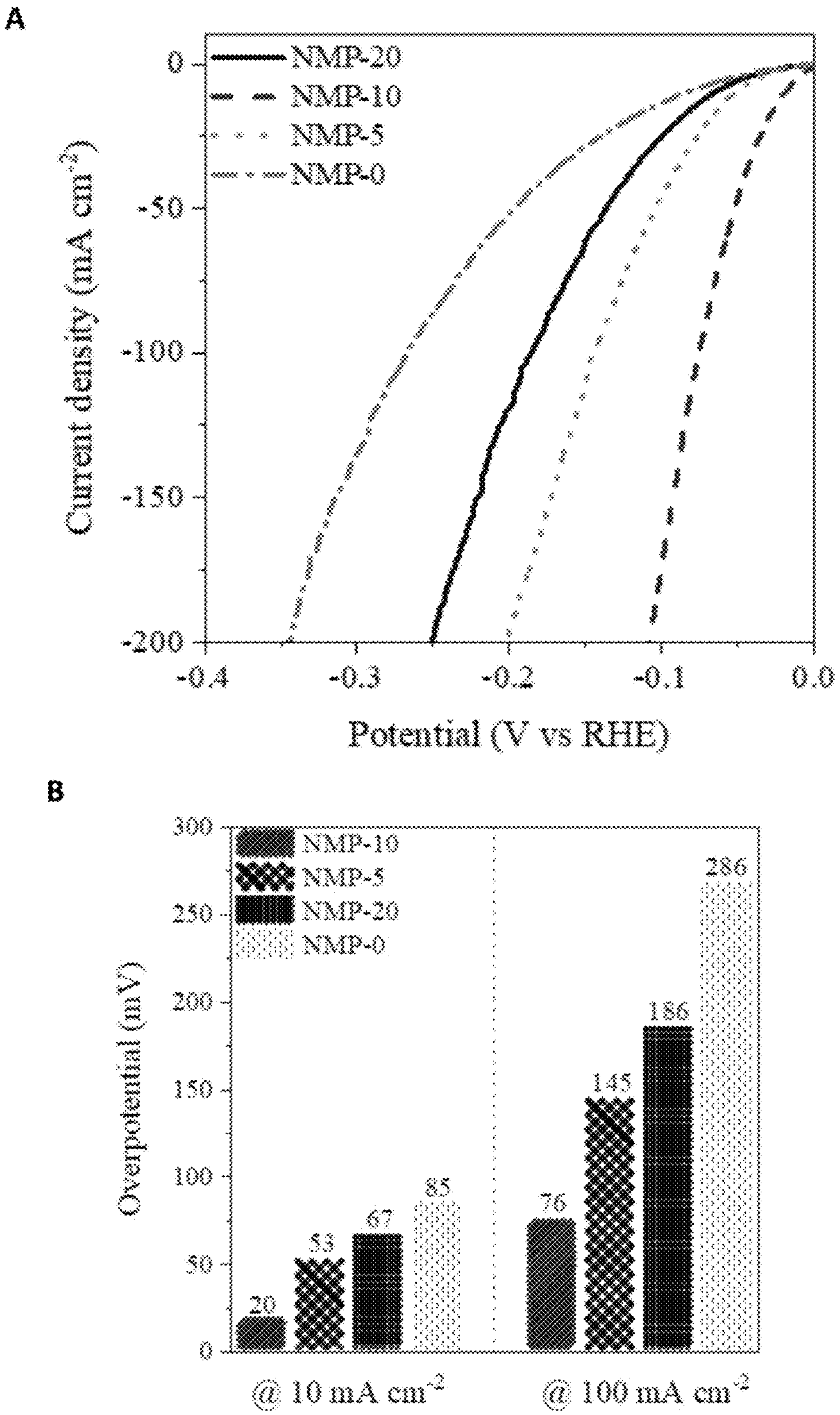
FIG. 4. Electrochemical performance of as-made electrocatalysts for HER in 1 M KOH. (a) Polarization curves with iR compensation; (b) Overpotential values when the current density is 10 and 100 mA $cm^{-2}$, respectively; (c) Their corresponding Tafel plots; (d) EIS spectra, (e) Difference in the current density plotted against the scan rate at −0.55 V vs Ag/AgCl and (f) ECSA normalized current densities of the prepared samples; (g) Comparison of overpotentials and Tafel slopes at 10 mA $cm^{-2}$ for the NMP-10 catalyst with recent reported active HER electrocatalysts; (h) Stability test of the NMP-10 catalyst.
Figure 4:
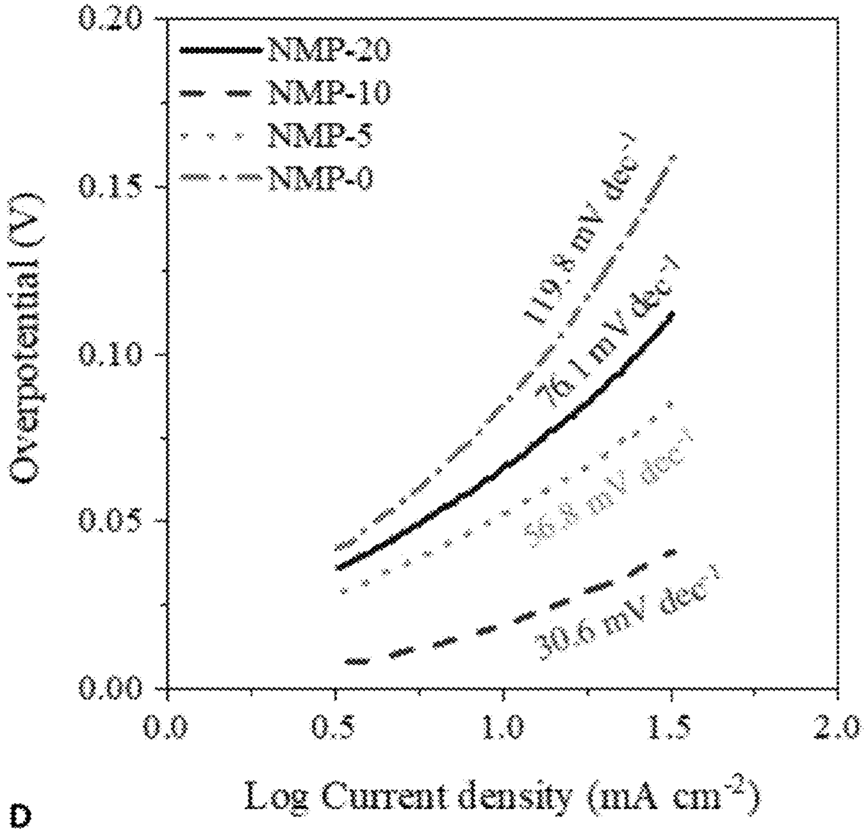
Figure 4:
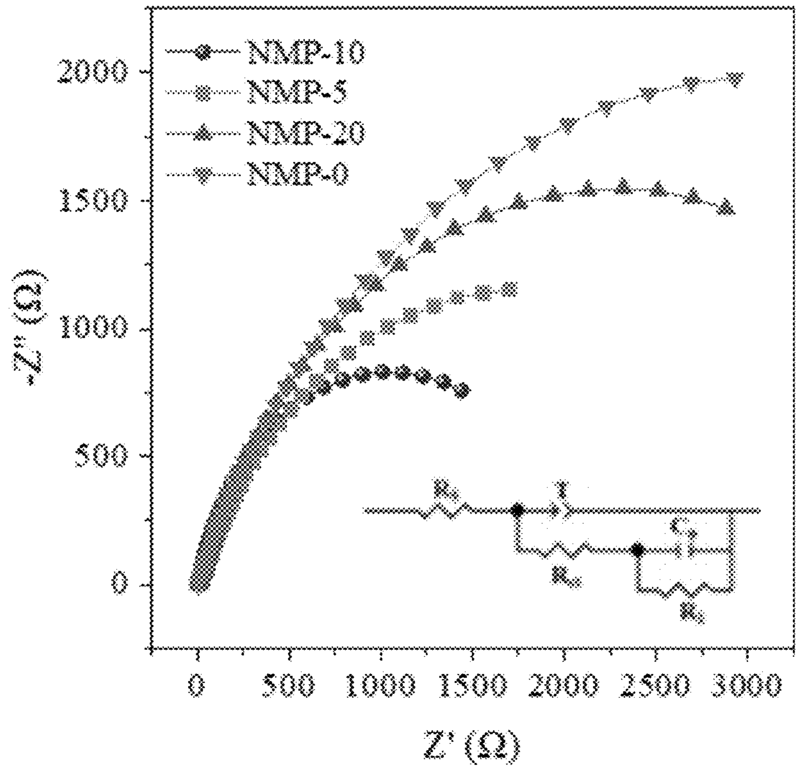
Figure 4:
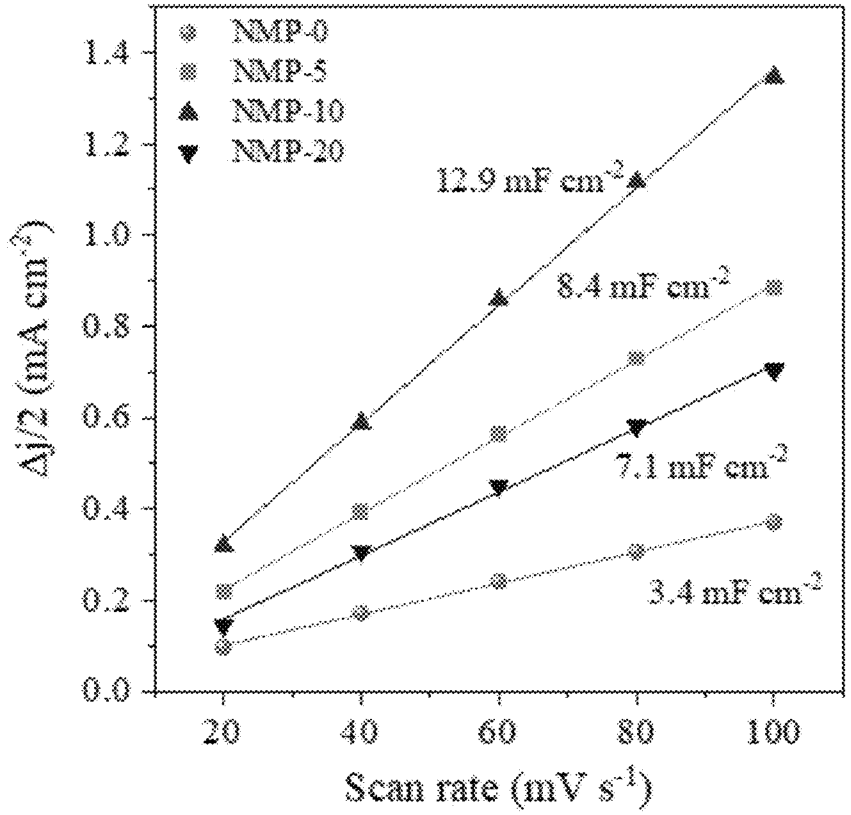
Figure 4:
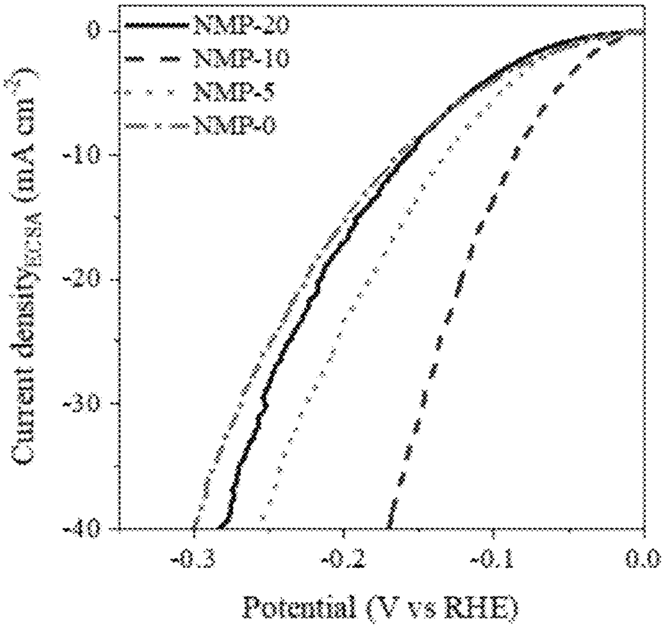
Figure 4:
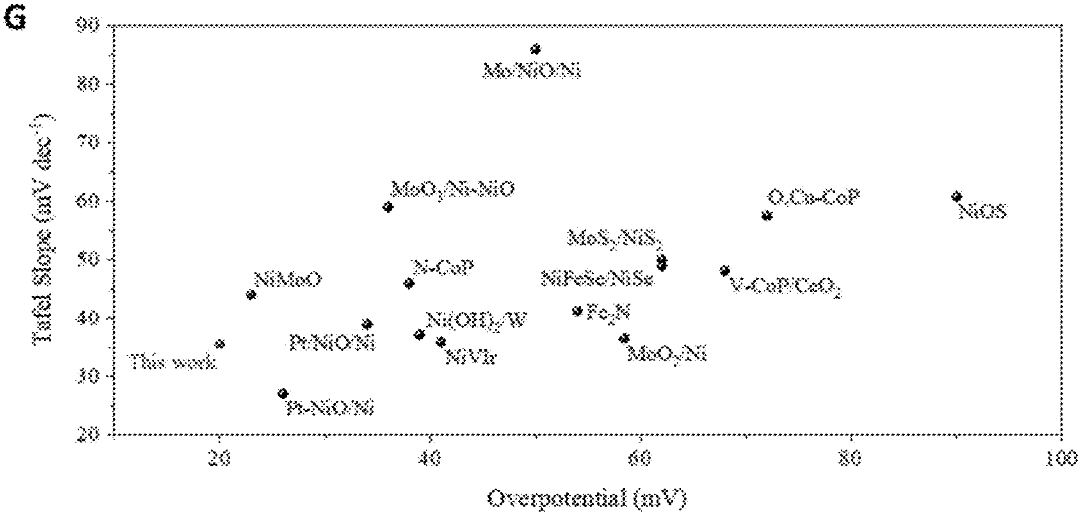
Figure 4:
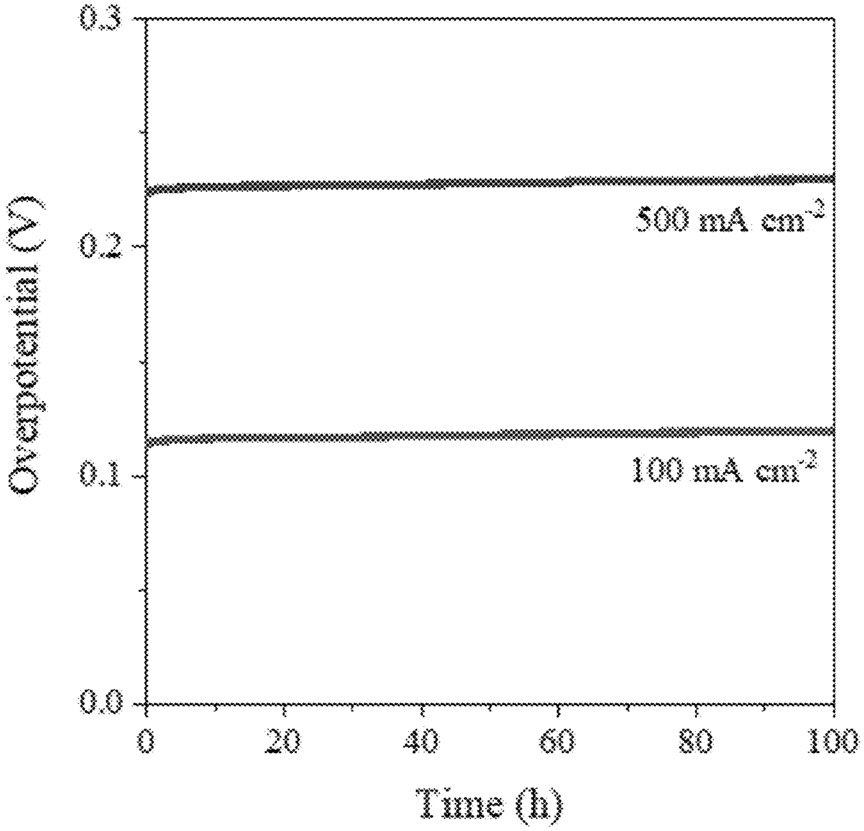
Figure 8:
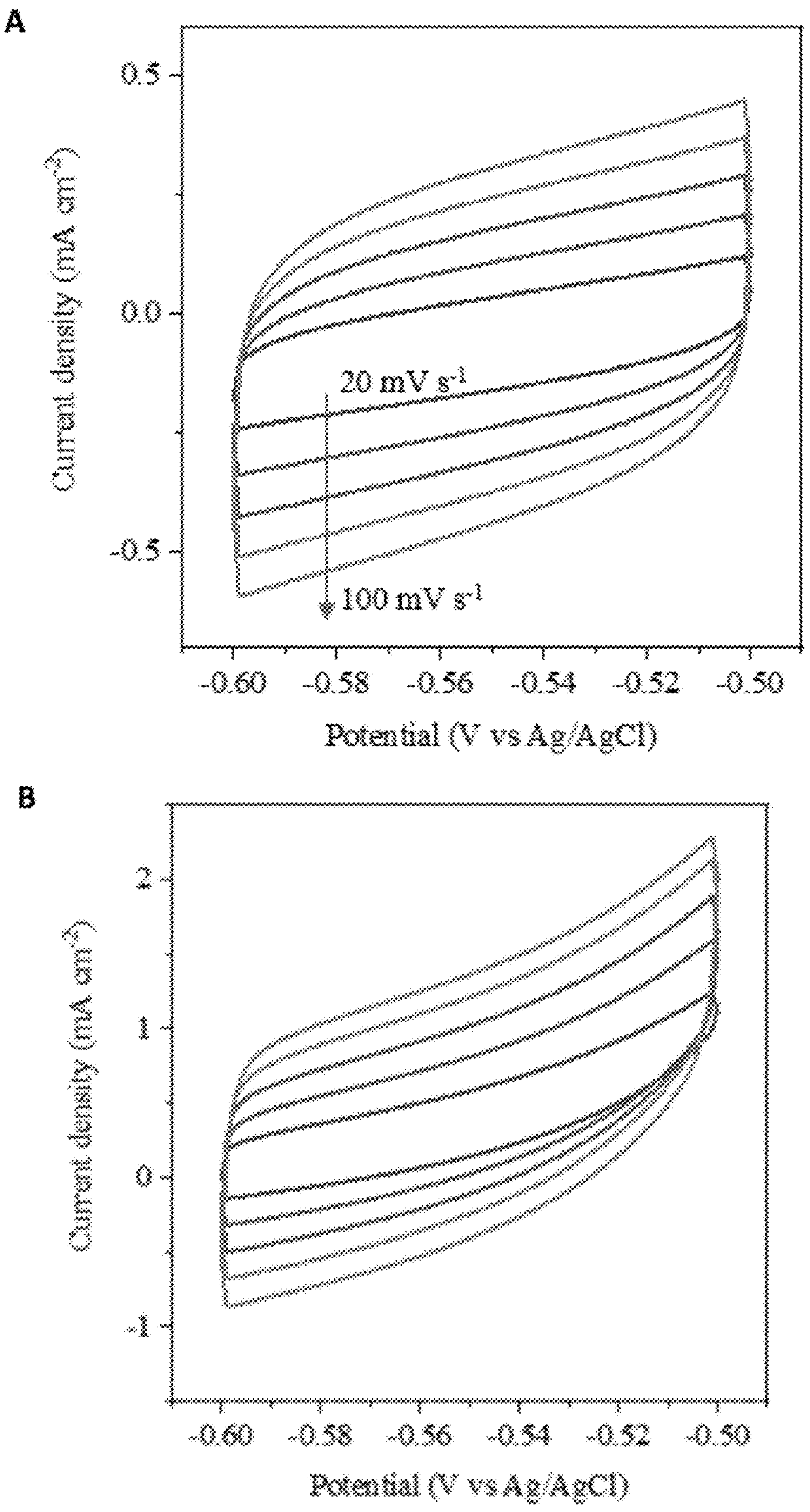
FIG. 8. Depicts CV curves of (a) NMP-0, (b) NMP-5, (c) NMP-10 and (d) NMP-20 recorded in the range of −0.6 and −0.5 V vs. Ag/AgCl, respectively.
Figure 8:
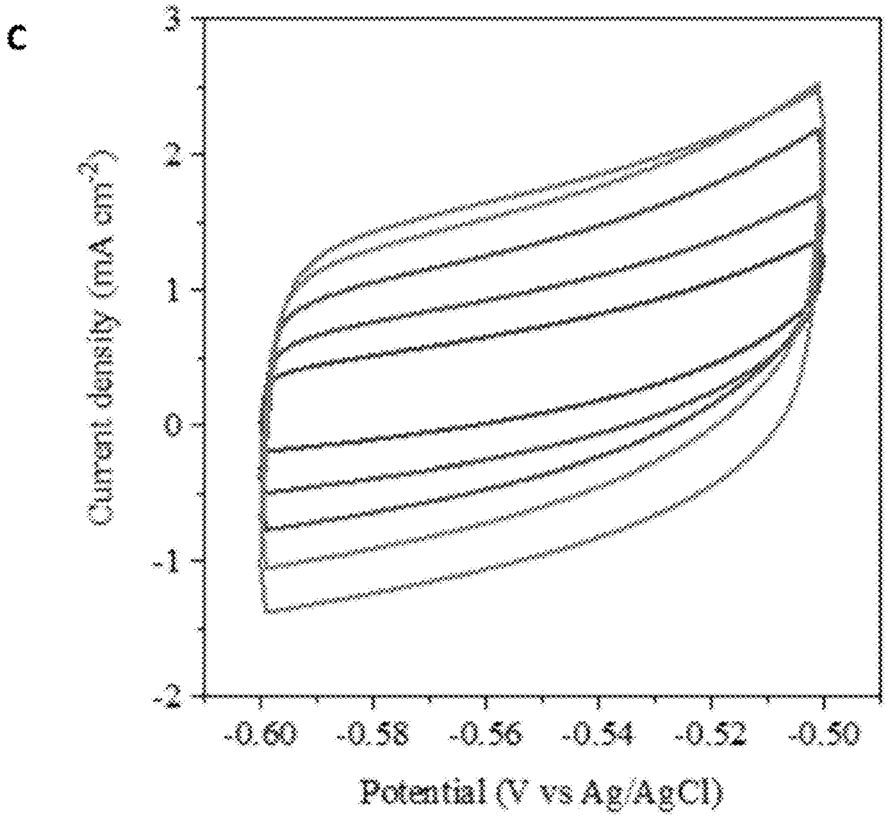
Figure 8:
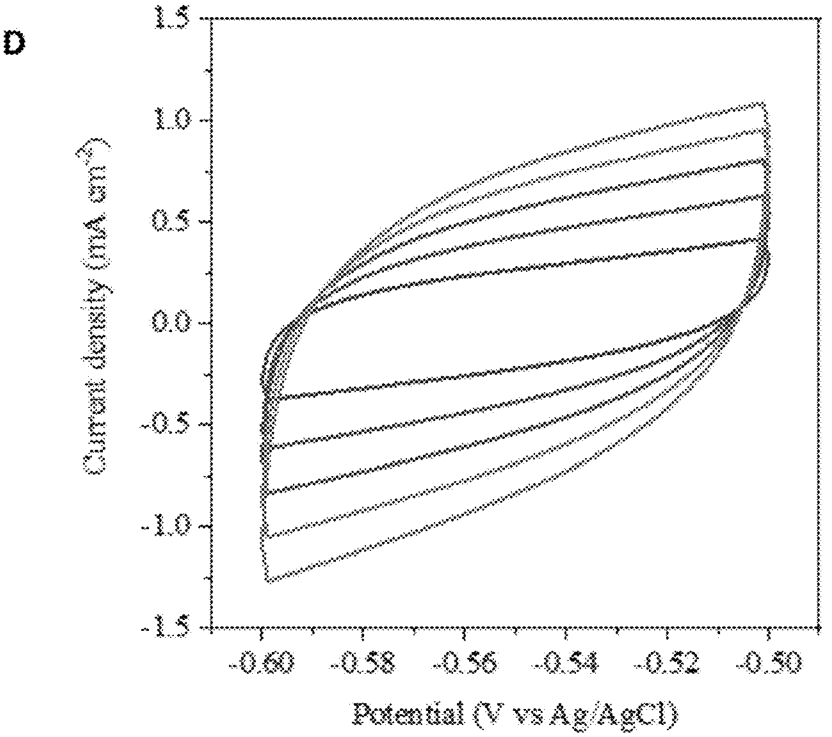
Figure 9:
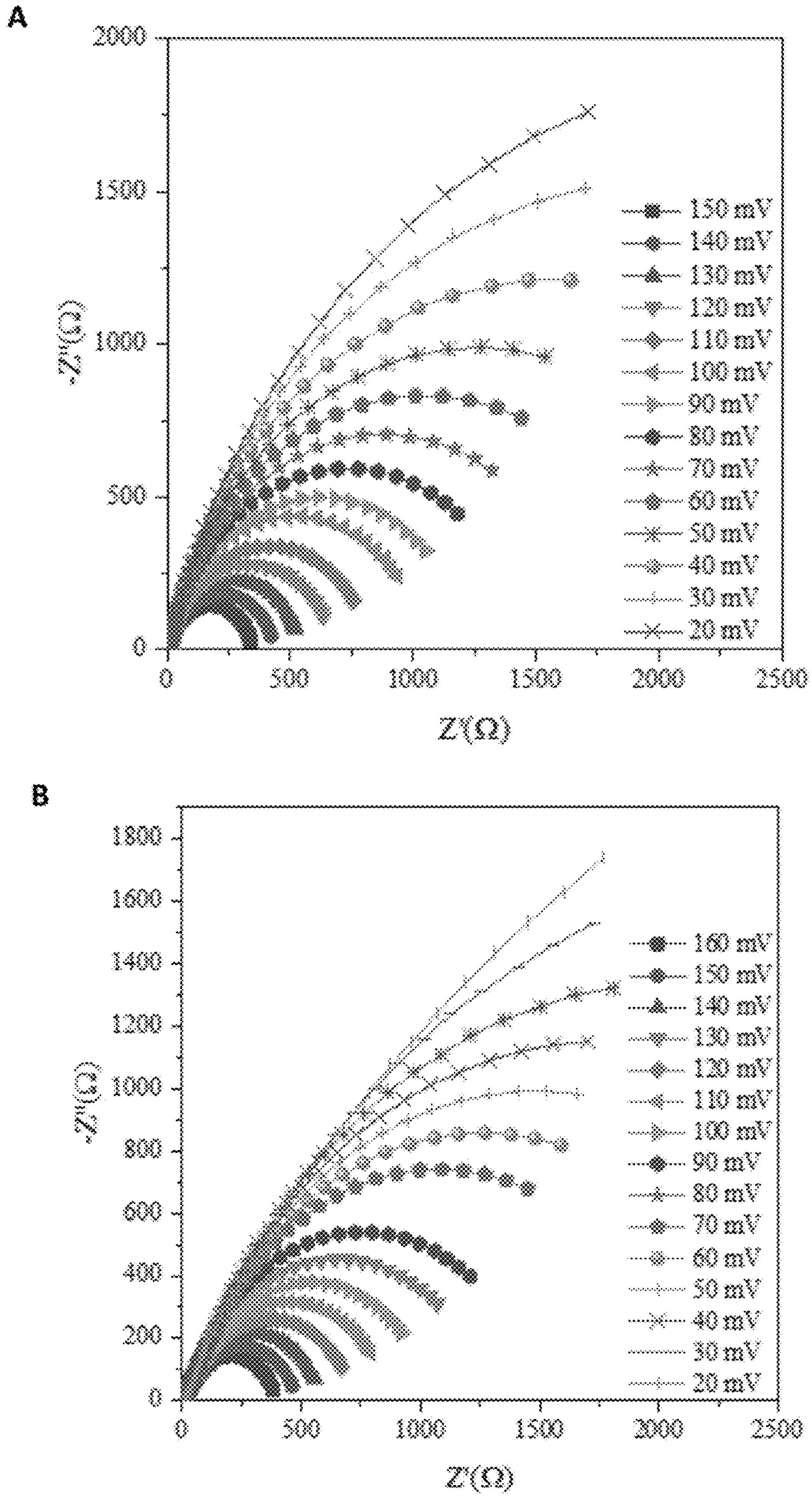
FIG. 9. Depicts Nyquist plots of (a) NMP-0, (b) NMP-5, (c) NMP-10 and (d) NMP-20 in 1 M KOH at various HER overpotentials. The scattered symbols represent the experimental results, and the solid lines are simulation fitted results.
Figure 9:
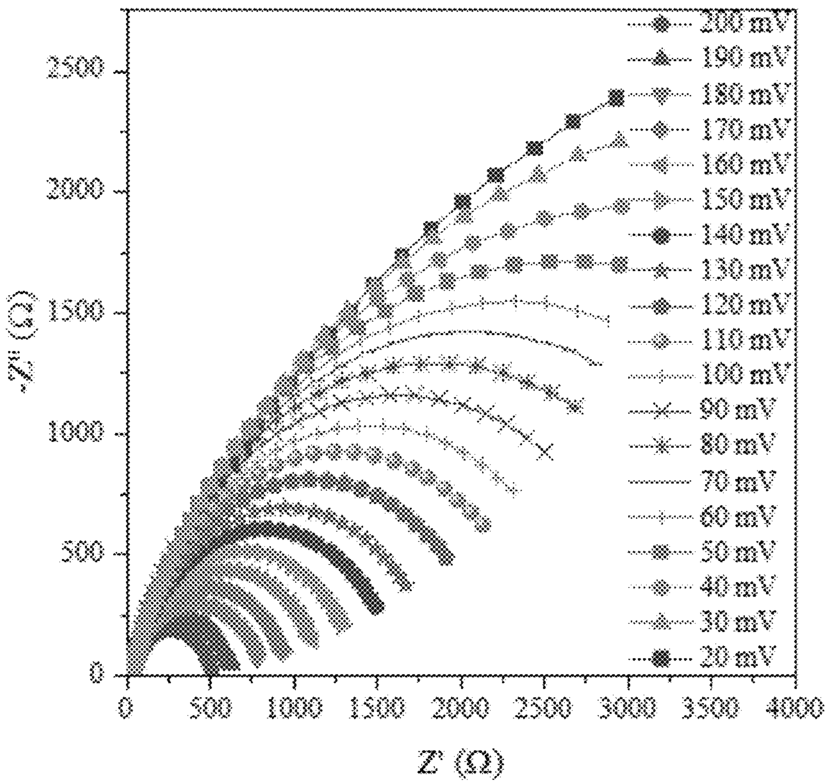
Figure 9:
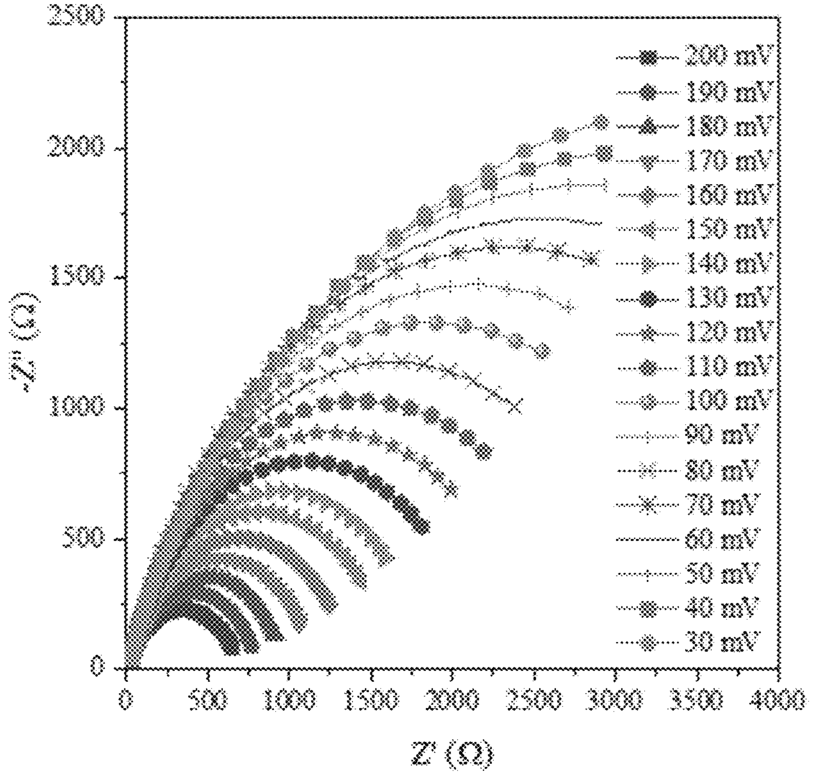

To shed light on the superior electrochemical characteristics induced by phase engineering, the electrochemical performance of the fabricated materials is evaluated in a 1.0 M KOH electrolyte. FIG. 4*a* shows the polarization curves of the samples. NMP-10 exhibits the best HER performance among these electrodes, and the overpotential of NMP-10 reaching a catalytic current density of 10 mA $cm^{-2}$ is 20 mV, which is much lower than that of NMP-5 (53 mV), NMP-20 (67 mV), and NMP-0 (85 mV). More importantly, as depicted in FIG. 4*b*, only 76 mV is needed for NMP-10 to reach 100 mA $cm^{-2}$, indicating excellent electrocatalytic performance. From the point of view of HER kinetics evaluated by Tafel plots, the NMP-10 catalyst delivers the lowest slope value of 30.6 mV $dec^{-1}$, outperforming the NMP-5 catalyst (56.8 mV $dec^{-1}$), NMP-20 catalyst (76.1 mV $dec^{-1}$), and NMP-0 catalyst (119.8 mV $dec^{-1}$), implying the superior reaction kinetic for the NMP-10 catalyst (FIG. 4*c*). Moreover, the Tafel slope of NMP-10 is close to 30 mV $dec^{-1}$, indicating the HER kinetic process mainly controlled by the water dissociation step ($M+H_2O+e \rightarrow MH_{ads}+OH^-$, M stands for catalyst, i.e., Volmer-Tafel mechanism). On the contrary, the Tafel slopes of NMP-5, NMP-20, and NMP-0 landed into the rage of 40~120 mV $dec^{-1}$, indicating the rate-determining step being insufficient hydrogen intermediate combination ($MH_{ads}+H_2O+e- \rightarrow M+H_2+OH^-$, i.e., Volmer-Heyrovsky step). It is also worth noting that the improved HER performance is not observed with the increasing $MoNiP_2$ content. This way, the improvement in the HER performance must be due to the synergistic effect among multiple components with the detailed synergistic effect discussed later. Furthermore, electrochemical impedance spectroscopy (EIS) is employed to explore the HER kinetics at the electrode and electrolyte interface, as shown in FIG. 4*d*. The recorded Nyquist diagrams are simulated by the double-parallel equivalent circuit model, where Ret reflects the charge-transfer kinetics (insets of FIG. 4*d*), and the values of 10.36, 66.18, 76.89 and 133.70Ω for the NMP-10, NMP-5, NMP-20 and NMP-0 samples indicate the enhanced HER performance was attributed to a lower charge transfer. Moreover, we further measure electrochemical double-layer capacitances (Cal) with a simple cyclic voltammetry (CV) method to evaluate the electrochemical surface area of the fabricated catalysts (FIG. 8), where Cal is well regarded as being directly proportional to the effective surface area of the catalyst. Obviously, as can be seen from FIG. 4*c*, the $C_{dl}$ values are obtained to be ~12.9, 8.4, 7.1, and 3.4 mF/$cm^2$ for the NMP-10, NMP-5, NMP-20, and NMP-0 samples, indicating that the NMP-10 catalyst has a more active surface area. Then, normalized to the ECSA specific current density. NMP-10 shows much higher specific current density than the other catalysts over the entire measured voltage range (FIG. 4*f*), suggesting that the intrinsic activity of NMP-10 electrode is indeed higher than the NMP-5, NMP-20, and NMP-0 catalysts. Remarkably, our electrocatalyst exhibited excellent electrochemical performance in terms of overpotential and Tafel slopes compared with most recently reported catalysts, even for some noble metal-based catalysts (FIG. 4*g*). The stability of the catalyst is then investigated under electrocatalytic operation. Particularly, we measure the practical operation of the NMP-10 catalyst via electrolysis at a fixed cathodic current density (~100 and 500 mA/$cm^2$). No obvious degradation has been observed for electrolysis even after a long period of 100 h, suggesting the potential of using these catalysts over a long duration in an electrochemical process.

Figure 5:
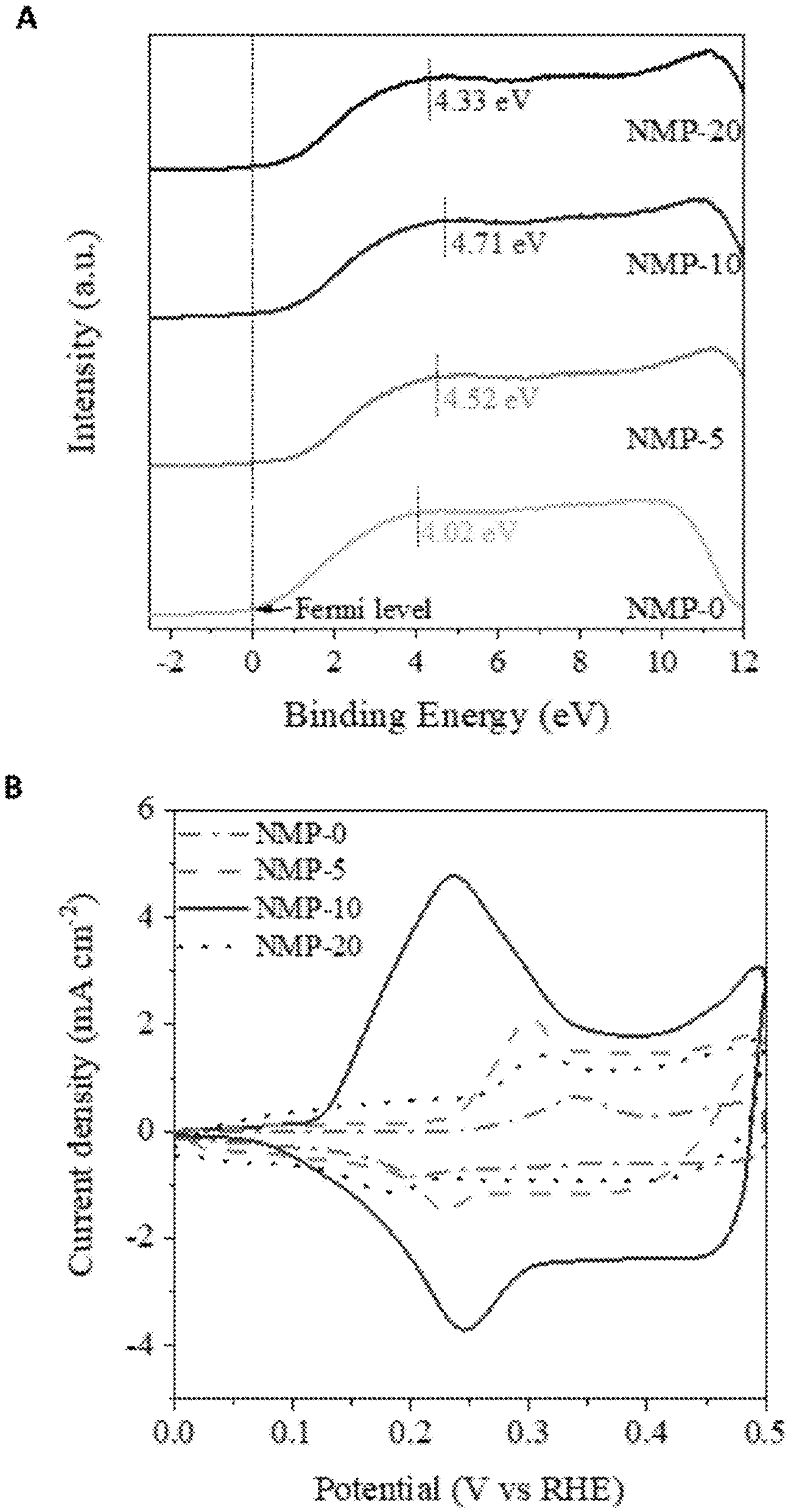
FIG. 5. Mechanism analysis. (a) UPS spectrum and (b) CV curves recorded at 0~0.5 V (vs RHE) of the prepared catalysts. (c) Plots of Co vs n of the catalysts during HER in 1 M KOH; (d) EIS-derived Tafel plots of the catalysts obtained from the hydrogen adsorption resistance, $R_2$.
Figure 5:
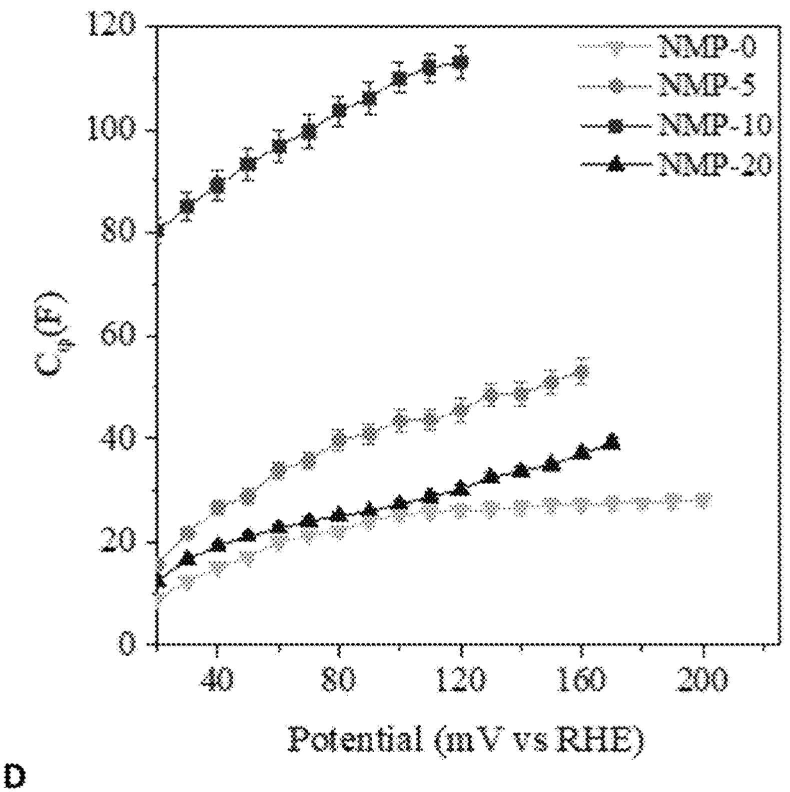
Figure 5:
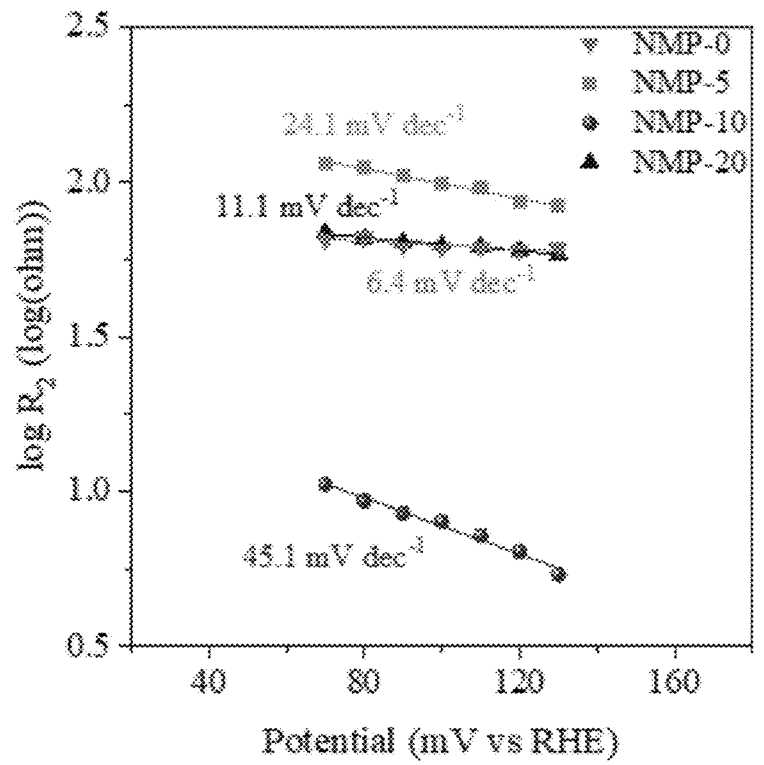

According to systematic experimental work and DFT theoretical calculations, hydrogen binding energy (HBE) can be used as a descriptor of HER performance. Therefore, in order to explore the activity mechanism of the obtained catalysts in depth, correlation studies between HER activity and experimentally measured HBE was constructed using ultraviolet photoelectron spectroscopy (UPS) spectroscopy and CV methods. Firstly, the valence-state structure of the prepared catalysts is examined using UPS. The electron bands of all samples crossed the Fermi level (FIG. 5*a*), suggesting their metallic nature. The peaks next to the Fermi level correspond to the metallic Ni 3*d* states. The positions of their binding energy are far from the Fermi level in the following order: NMP-0<NMP-20<NMP-5<NMP-10. Based on the d-band theory, a downshifted d-band would result in a weakened adsorption strength. Therefore, the order of HBE is: NMP-0>NMP-20>NMP-5>NMP-10. Furthermore, the HBE of active sites can be directly correlated with the potential of $H_{upd}$ desorption peak ($E_{peak}$) via $\Delta H=-FE_{peak}$, which yields a low HBE of −0.23 eV for NMP-10 as compared with that of NMP-5 (−0.29 eV), NMP-20 (−0.30 eV) and NMP (−0.34 eV) (FIG. 5*b*), which is consistent with the UPS results. In this case, a weaker H chemisorption strength of NMP-10 compared to other catalysts induces the acceleration of the hydrogen desorption behavior. Then, the hydrogen adsorption behavior on the catalysts is also investigated via the operando EIS technique since the second parallel components ($C_\varphi$ and $R_1$) can reveal the hydrogen adsorption behavior on the catalyst surface, where $R_1$ and $C_\varphi$ reflect the hydrogen adsorption resistance and pseudo-capacitance, respectively (inset of FIG. 4*d*, FIG. 8, FIG. 11). As shown in FIG. 5*c*, the $C_\varphi$ vs $\eta$ curves provides the hydrogen adsorption charge information on the catalyst surface during HER process. The highest $C_\varphi$ value of NMP-10 indicates the highest $H_{ads}$ coverage on the surface among the prepared samples, which is consistent with the Tafel slope analysis. In this way, the corresponding hydrogen adsorption kinetics on the electrode surface has also changed. Given the potential dependent $R_1$ of all catalysts, it is reasonable to quantify their hydrogen adsorption kinetics by plotting log $R_1$ vs. $\eta$ and calculating the EIS-derived Tafel slopes under Ohm's law. As shown in FIG. 5*d*, the obviously decreased EIS-derived Tafel slope for NMP-10 demonstrates enhanced hydrogen adsorption kinetics. Overall, the above detailed experiment results strongly demonstrate the controllable surface chemical inhomogeneity in the ternary heterostructure, optimizing the HER process via accelerating the hydrogen intermediate adsorption and desorption kinetics.

In this work, we developed a facile $H_2$-assisted method to prepare ternary $Ni_2P/MoNiP_2/MoP$ crystalline/amorphous heterostructure nanowires on the conductive substrate. Based on various characterization techniques, the content of the $MoNiP_2$ phase and the crystallinity of the MoP phase can be tuned by simply controlling the $H_2$ concentration. The optimized surface chemical inhomogeneity yields a proper hydrogen binding energy and favorable hydrogen adsorption/desorption kinetics. Thus, the obtained electrocatalyst exhibits a superior alkaline HER performance, delivering overpotentials of 20 and 76 mV to reach current densities of 10 and 100 mA $cm^{-2}$ with a Tafel slope of 30.6 mV $dec^{-1}$, respectively. Importantly, the catalysts give excellent stability under a constant 100 h operation, higher than most previously reported electrocatalysts. This work not only exhibits the potential application of ternary $Ni_2P/MoNiP_2/MoP$ crystalline/amorphous heterostructure nanowires catalysts for practical larger-scale electrochemical water splitting, but also demonstrates the importance of phase engineering in the rational design and synthesis of heterostructure electrocatalysts.

EXPERIMENTAL

Preparation of $Ni_2P/MoNiP_2/MoP$ Ternary Heterostructure Nanowire on Nickel Foam In this work, all nickel foams were treated as follows: acetone treatment, hydrochloric acid (2 M), deionized water treatment, and ethanol treatment for 10 min, respectively. Typically, add 0.5 mmol $NiCl_2$ and 0.5 mmol $Na_2MoO_4$ to 15 mL of deionized water and mix well. Then, a piece of nickel foam and the homogenous solution were sealed into a Teflon-lined stainless-steel autoclave heated at 160° C. for 6 h in an electric oven. After the hydrothermal treatment, the resulting nickel foam covered with $NiMoO_4$ nanowires was washed with deionized water and ethanol under ultrasonication several times, followed by drying in a vacuum oven at 80° C. overnight.

Then, $NiMoO_4$ nanowires/nickel foam and 800 mg of $NaH_2PO_2$ were put into two separate positions of the quartz boat, with $NaH_2PO_2$ powder is upstream side of the gas. Then, the samples were treated at 500° C. for 2 h with a heating rate for 2.5° C./min under $Ar/H_2$ atmosphere, and the flow rate was adjusted to 200/0, 195/5, 190/10, and 180/20 sccm, respectively. The final product was obtained after cooling to room temperature.

Material Characterization

The prepared samples were characterized by scanning electron microscopy (SEM, Phenom-World, The Netherlands), field-emission SEM (SU-8010, Hitachi, Tokyo, Japan), Bruker D2 Phaser (Bruker, Billerica, MA, USA) instrument equipped with a monochromatized Cu-Kα radiation, Transmission electron microscopy (TEM) and high-resolution (HR) TEM (Tecnai $G^2$ F30, FEI, Hillsboro, OR, USA), X-ray photoelectron spectroscopy (XPS) (VG Multilab 2000, Thermo Fisher Scientific, Waltham, MA, USA). SPECS Leybold EA 11 MCD hemispherical electron analyzer was employed to acquire UPS He II spectra with an excitation energy of 40.82 eV. The binding energy scale was referenced to the Fermi level of Au sample. The area and perimeter of the crystalline particle were counted with the software ImageJ.

Electrochemical Measurement

All electrochemical characterization was surveyed via Gamry 300 electrochemical workstation with a conventional three-electrode cell under room temperature. The prepared sample ($Ni_2P/MoNiP_2/MoP$ ternary heterostructure nanowire on nickel foam), saturated calomel electrode and a carbon rod were employed as the working electrode, the reference electrode and counter electrode, respectively. The active area of the electrocatalyst immersed in the electrolyte was defined by applying silicon rubber. All potentials calibrated are versus the reversible hydrogen electrode (RHE). The activities of HER were investigated in 1M KOH aqueous solution (pH=14) with a scan rate of 5 mV $s^{-1}$.

What is claimed is:

1. A ternary heterostructure comprising $Ni_2P$, $MoNiP_2$, and MoP, wherein the ternary heterostructure comprises crystalline regions and amorphous regions.

2. The electrocatalyst of claim 1, wherein the ternary heterostructure has a crystallinity between 30-95%.

3. The ternary heterostructure of claim 1, wherein $Ni_2P$ nanoparticles, $MoNiP_2$ nanoparticles, and MoP nanoparticles are disposed on at least one surface of the ternary heterostructure.

4. The ternary heterostructure of claim 1, wherein the ternary heterostructure comprises a plurality of nanowires.

5. The ternary heterostructure of claim 4, wherein the plurality of nanowires have an average diameter of 25-200 nm.

6. The ternary heterostructure of claim 1, wherein the ternary heterostructure has an overpotential between 20-53 mV when used as an electrocatalyst in a hydrogen evolution reaction at a current density of 10 mA $cm^{-2}$ at 25° C. in an electrolyte comprising 1M KOH.

7. The ternary heterostructure of claim 1, wherein the ternary heterostructure comprises a plurality of nanowires having an average diameter of 25-200 nm; $Ni_2P$ nanoparticles, $MoNiP_2$ nanoparticles, and MoP nanoparticles are disposed on at least one surface of each of the plurality of nanowires; and the ternary heterostructure has a crystallinity between 40-75%.

8. The ternary heterostructure of claim 7, wherein the ternary heterostructure has an overpotential between 20-53 mV when used as an electrocatalyst in a hydrogen evolution reaction at a current density of 10 mA $cm^{-2}$ at 25° C.

9. The ternary heterostructure of claim 7, wherein the ternary heterostructure has a crystallinity between 40-50%; and the ternary heterostructure has an overpotential between 20-30 mV when used as an electrocatalyst in a hydrogen evolution reaction at a current density of 10 mA $cm^{-2}$ at 25° C. in an electrolyte comprising 1M KOH.

10. An electrode comprising the ternary heterostructure of claim 1.

11. An electrochemical cell comprising the electrode of claim 10, a counter electrode, optionally a reference electrode, and an electrolyte solution comprising water and hydroxide ion.

12. A method of producing hydrogen gas, the method comprising applying an electric current between the electrode of claim 11 and the counter electrode resulting in the electrolytic reduction of water and the formation of hydrogen gas.

13. A method of preparing the ternary heterostructure of claim 1, the method comprising: contacting $NiMoO_4$ with an atmosphere comprising $PH_3$, $H_2$, and optionally an inert gas thereby forming the ternary heterostructure.

14. The method of claim 13, wherein the step of contacting $NiMoO_4$ with the atmosphere comprising $PH_3$, $H_2$, and optionally the inert gas is conducted at a temperature between 400-700° C.

15. The method of claim 13 further comprising the step of heating $NaH_2PO_2$ thereby generating $PH_3$.

16. The method of claim 15, wherein the $NaH_2PO_2$ is heated at a temperature between 400-700° C.

17. The method of claim 13, wherein the $NiMoO_4$ is supported on a nickel foam substrate.

18. The method of claim 13, wherein the is $NiMoO_4$ is contacted with the $H_2$ at a concentration of 2.5-10% v/v in the inert gas.

19. The method of claim 13, wherein the ternary heterostructure has a crystallinity between 40-50%.

20. The method of claim 13, wherein the method comprises: contacting $NiMoO_4$ an atmosphere comprising $PH_3$, $H_2$, and argon gas at a temperature of 450-55° C., wherein the $NiMoO_4$ is supported on a nickel foam substrate; the $NiMoO_4$ is contacted with the $H_2$ at a concentration of 2.5-5% v/v in argon gas thereby forming the ternary heterostructure, wherein the ternary heterostructure comprises a plurality of nanowires having an average diameter of 25-100 nm, wherein $Ni_2P$ nanoparticles, $MoNiP_2$ nanoparticles, and MoP nanoparticles disposed on at least one surface of each of the plurality of nanowires, wherein the ternary heterostructure has a crystallinity between 40-50%.

* * * * *